(12) United States Patent
Jordan

(10) Patent No.: US 11,655,004 B2
(45) Date of Patent: May 23, 2023

(54) MULTI-SPEED REAR DRIVE FOR A BICYCLE

(71) Applicant: World Bicycle Relief, NFP, Chicago, IL (US)

(72) Inventor: Brian Jordan, Highland Park, IL (US)

(73) Assignee: World Bicycle Relief, NFP, Chicago, IL (US)

( * ) Notice: Subject to any disclaimer, the term of this patent is extended or adjusted under 35 U.S.C. 154(b) by 2 days.

(21) Appl. No.: 17/394,050

(22) Filed: Aug. 4, 2021

(65) Prior Publication Data

US 2022/0041248 A1 Feb. 10, 2022

Related U.S. Application Data

(60) Provisional application No. 63/063,672, filed on Aug. 10, 2020.

(51) Int. Cl.
*B62M 25/06* (2006.01)
*B62M 9/04* (2006.01)
*B62M 9/10* (2006.01)
*B62M 9/00* (2006.01)

(52) U.S. Cl.
CPC .............. *B62M 25/06* (2013.01); *B62M 9/00* (2013.01); *B62M 9/04* (2013.01); *B62M 9/10* (2013.01); *B62M 9/105* (2013.01)

(58) Field of Classification Search
CPC . B62M 9/00; B62M 9/02; B62M 9/04; B62M 9/10; B62M 9/105; B62M 9/14; B62M 5/00; B62M 1/26; B62M 1/36; B62M 1/38; B62M 25/00; B62M 25/06; B62M 1/30; B62M 1/32; B60B 27/02; B60B 27/03; B60B 27/047; F16H 55/30; F16H 55/17; F16H 2055/178; B62K 23/00; B62K 23/08
See application file for complete search history.

(56) References Cited

U.S. PATENT DOCUMENTS 378,088 A * 2/1888 Foote ..................... F16H 9/04
474/4
444,341 A * 1/1891 Egg ......................... F16H 55/36
474/74

(Continued)

FOREIGN PATENT DOCUMENTS

| KR | 10-0361580 B1 | 11/2002 | |
|---|---|---|---|
| KR | 20110039179 A | * 4/2011 | .............. B62M 9/10 |
| KR | 10-1519346 B1 | 5/2015 | |

*Primary Examiner* — Michael R Mansen
*Assistant Examiner* — Raveen J Dias
(74) *Attorney, Agent, or Firm* — Sterne, Kessler, Goldstein & Fox P.L.L.C.

(57) ABSTRACT

A system and method for simple transmission of a multi-speed bicycle is provided. A bicycle can have a transmission that can be toggled by a kickback shifting mechanism. A rear wheel hub can support a freewheel having a high speed gear sprocket and a low speed gear sprocket with dedicated chains to create dedicated gear-shifting. Rotating the pedal shaft in the non-drive direction approximately one-quarter rotation can toggle the transmission between the first gear ratio and the second gear ratio with a shifting surface that alternately allows driving engagement of the high speed gear sprocket with the rear wheel driver.

19 Claims, 25 Drawing Sheets

(56) References Cited

U.S. PATENT DOCUMENTS

| | | | |
|---|---|---|---|
| 620,390 A * | 2/1899 | Wells | B62K 19/44 280/261 |
| 2,162,646 A * | 6/1939 | Shipman | B62M 9/04 192/24 |
| 3,351,165 A | 11/1967 | Keizo | |
| 4,501,575 A | 2/1985 | Lapeyre | |
| 4,697,469 A * | 10/1987 | Takamiya | F16H 29/06 74/594.1 |
| 4,732,054 A * | 3/1988 | Takamiya | B62M 11/14 475/170 |
| 4,813,917 A * | 3/1989 | Borden | B62M 9/00 474/84 |
| 5,254,042 A * | 10/1993 | Chung-Suk | B62M 1/36 474/84 |
| 5,895,336 A * | 4/1999 | Yoo | B62M 11/145 280/238 |
| 5,921,363 A * | 7/1999 | Chiang | F16D 41/30 192/64 |
| 5,957,802 A * | 9/1999 | Yoo | B62M 11/145 475/12 |
| 6,264,575 B1 * | 7/2001 | Lim | F16D 41/30 192/64 |
| 6,361,461 B1 * | 3/2002 | Pusic | B62M 9/085 474/158 |
| 6,695,332 B1 * | 2/2004 | Kang | B62M 1/36 280/238 |
| 8,197,371 B2 * | 6/2012 | D'Aluisio | B62M 9/12 301/110.5 |
| 10,562,590 B2 * | 2/2020 | Hamed | B62M 9/122 |
| 2003/0034627 A1 | 2/2003 | Kim et al. | |
| 2006/0119068 A1 * | 6/2006 | Hee | B62M 9/04 280/260 |
| 2007/0278762 A1 * | 12/2007 | Chang | B62M 9/02 280/261 |
| 2008/0252037 A1 * | 10/2008 | Wesling | B62M 9/16 280/281.1 |
| 2008/0254929 A1 * | 10/2008 | Wesling | B62M 11/145 475/182 |
| 2012/0280466 A1 * | 11/2012 | Woods | B62M 1/36 474/148 |
| 2013/0252778 A1 * | 9/2013 | Samways | B62L 5/00 475/269 |
| 2017/0096030 A1 * | 4/2017 | Engel | B60B 27/047 |
| 2017/0101161 A1 | 4/2017 | Cohen et al. | |
| 2017/0334517 A1 * | 11/2017 | Zuniga | B62M 1/36 |
| 2019/0256169 A1 * | 8/2019 | Hamed | B62M 9/122 |
| 2020/0277022 A1 * | 9/2020 | Kakimi | B62M 9/06 |
| 2021/0283950 A1 * | 9/2021 | Keeley, II | F16D 41/14 |

* cited by examiner

MULTI-SPEED REAR DRIVE FOR A BICYCLE

CROSS-REFERENCE TO RELATED APPLICATIONS

This application claims the benefit of and priority to U.S. Provisional Patent Application No. 63/063,672, filed Aug. 10, 2020, which is incorporated herein by reference in its entirety for all purposes.

FIELD

Embodiments of the present invention relate to transmission for a pedal-driven vehicle, such as a bicycle. In particular, embodiments relate to transmission for a multi-speed bicycle with a kickback gear hub.

BACKGROUND

Bicycling has increased in popularity recently, in part, due to an acknowledgment of its utility. Bicycles can be used for long and short-range transportation and can provide a means for transporting goods. A single bicycle can operate under many conditions and in varied environments as well. For example, multi-speed bicycles can be operated on rough terrains as well as developed roads. These bicycles can include hub systems to facilitate speed shifting as needed between environments.

In the bicycle industry, hub systems can be expensive to produce and/or repair. Transmission can require a handlebar-mounted shifter, which can be difficult to maintain in rugged environments. Shifting cables can be used to connect the shifter to a rear derailleur and/or other transmission means, however, these components can be easily damaged and/or contaminated. Further, transmission with kickback hubs can be complex and/or inconvenient. For example, in multi-speed bicycles, a kickback hub transmission can sequentially cycle through speeds instead of directly activating a speed.

BRIEF SUMMARY

A multi-speed transmission for a bicycle wheel hub can include a driver to be arranged on a longitudinal axis of a bicycle wheel hub, a plurality of drive teeth arranged radially on the driver, and a multi-speed freewheel arranged on the longitudinal axis. The freewheel can include a first sprocket to be connected to a first pedal drive sprocket via a first chain, a second sprocket to be connected to a second pedal drive sprocket via a second chain, a plurality of pawls radially arranged on the second sprocket to engage with the drive teeth when the pedal shaft is rotated in the non-drive direction a predetermined rotation, a plurality of bias elements arranged radially within an interior area of the second sprocket to bias the plurality of pawls toward the drive teeth, and a shift ring arranged within an interior area of the second sprocket to alternately block engagement of the pawls with the drive teeth.

A multi-speed transmission for a bicycle can include a driver having a plurality of drive teeth, a plurality of pawls radially arranged on the driver, a first sprocket engaged with the plurality of pawls having a first gear ratio, a second sprocket having a second gear ratio higher than the first gear ratio, a plurality of pawls arranged radially on the second sprocket to drivingly engage the drive teeth of the driver after moving counterclockwise a predetermined rotation amount, a ring to rotate with the first sprocket and extend within an interior area of the second sprocket, and a plurality of notches radially arranged on the ring to engage with the pawls of the second sprocket and prevent the pawls of the second sprocket from engaging with the drive teeth to drive the bicycle with the second sprocket. The bicycle can be driven with the second sprocket when the pawls of the second sprocket engage with the drive teeth and the pawls of the first sprocket are overdriven. The bicycle can be driven with the first sprocket when the second sprocket is prevented from engaging with the drive teeth of the driver.

A multi-speed transmission for a bicycle can include a first sprocket and a second sprocket configured to selectively transmit torque to a wheel of a bicycle, a transmitting sprocket of the first sprocket and the second sprocket can be shifted through pedaling in a non-drive direction.

BRIEF DESCRIPTION OF THE DRAWINGS/FIGURES

The accompanying drawings, which are incorporated herein and form part of the specification, illustrate embodiments and, together with the description, further serve to explain the principles of the embodiments and to enable a person skilled in the relevant art(s) to make and use the embodiments.

Features and advantages of the embodiments will become more apparent from the detailed description set forth below when taken in conjunction with the drawings, in which like reference characters identify corresponding elements throughout.

DETAILED DESCRIPTION

Figure 1:
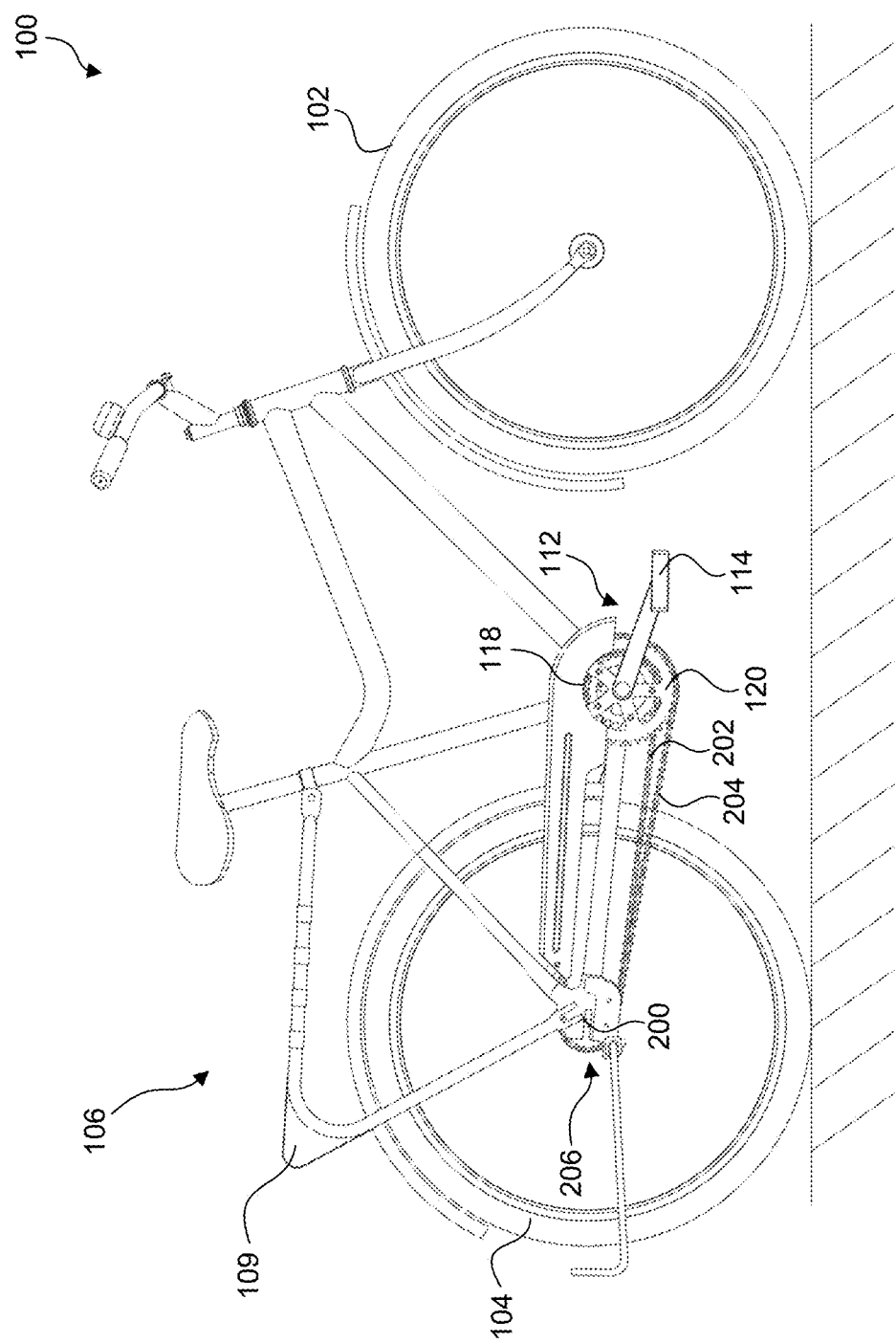
FIG. 1 is a side view of a multi-speed bicycle according to various aspects of the invention.

The present invention(s) will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Aspects of the present disclosure provide a multi-speed bicycle that can be used on various surfaces, including rough and/or sloped terrain and paved and unpaved roads. The bicycle can also be relatively straight in the drive direction to assemble. Assembly can require easily sourced parts/and or materials so that the design can be both accessible and inexpensive to produce. Additionally, the bicycle can be particularly robust such that maintenance needs are infrequent.

In some aspects, a multi-speed bicycle can include one or more sprocket sets to provide multiple gear ratios corresponding to, for example, a low gear ratio and a high gear ratio, respectively. These two gear ratios can be suitable to traverse a wide variety of terrains. A sprocket set can include a pedal drive sprocket, a drive chain, and a gear sprocket. Each sprocket set having a dedicated chain can be easy to assemble and maintain. A freewheel comprising the one or more sprocket sets can arrange the gear sprockets along a longitudinal axis of the rear wheel hub. The gear sprockets can rotate freely about the rear wheel hub, or engage with a driver, also radially arranged along the longitudinal axis of the rear wheel hub. The driver can have radially arranged drive teeth that can engage with the one or more gear sprockets. For example, driving the bicycle at a first gear ratio can include pawls associated with a first gear sprocket drivingly engaged with the driver and drive teeth of the first gear sprocket to drive the bicycle at a first gear ratio. A second gear sprocket can provide a second gear ratio such that pawls associated with the second gear sprocket drivingly engage with the drive teeth of the driver to drive the bicycle at a second gear ratio. Driving engagement can transmit torque from the gear sprocket to the bicycle wheel.

In some aspects, a transmission comprising the one or more sprocket sets can be easily toggled to shift between the respective gear ratios. Instead of requiring a handlebar-mounted shifter and shifting cables, the transmission can be toggled, for example, by rotating transmission components, e.g., the pedal shaft and the corresponding sprocket set components, in the non-drive direction. In an aspect, the transmission can be toggled when transmission components are rotated in the non-drive direction a rotational amount required to transition from the first gear sprocket being drivingly engaged with the driver to a second gear sprocket being drivingly engaged with the driver.

A shift ring (e.g., a transmitting sprocket) can be arranged along the longitudinal axis to facilitate the transition and selectively transmit torque to the bicycle wheel. The shift ring can extend into portions of the interior of the second gear sprocket. As the pedal shaft is rotated in the non-drive direction the rotational amount required to transition from drivingly engaging the first gear sprocket at a first gear ratio to drivingly engaging the second gear sprocket at a second gear ratio, the freewheel can rotate about the longitudinal axis, allowing the pawls of the second gear sprocket to engage with the drive teeth of the driver. As the pedal shaft is rotated in the drive direction, the pawls of the second gear sprocket are drivingly engaged with the drive teeth of the driver such that the second gear sprocket is drivingly engaged and the bicycle is driven at a second gear ratio. At other rotations where the shift ring is extended into the interior of the second gear sprocket, the shift ring can block the pawls of the second gear sprocket from engaging with the drive teeth of the driver. Instead, the pawls of the second gear sprocket can engage with the shift ring at the locations where the shift ring is extended into the interior of the second gear sprocket. As the pedal shaft is rotated in the drive direction, the pawls associated with the first sprocket are drivingly engaged with the driver and drive teeth of the first gear sprocket to drive the bicycle at a first gear ratio.

Aspects of the present disclosure will now be described in more detail with reference to the figures. A multi-speed bicycle 100 is shown in FIG. 1. In some aspects, bicycle 100 can include a front wheel 102, a rear wheel 104, a frame 106, a rack member 109, a rear wheel hub 200, and/or a multi-speed freewheel 206.

Frame 106 can support front wheel 102 and/or rear wheel 104. Rear wheel hub 200 can be positioned on the rear axle of bicycle 100 such that it can be rotationally supported by the rear axle. Rear wheel hub 200 can be operatively connected to the spokes and annular rim of rear wheel 104. Multi-speed freewheel 206 can be mounted onto rear wheel hub 200 and can rotate freely about the rear axle.

A rack member 109 can be removably attached to frame 106. Rack member 109 can include a plurality of members connected to frame 106 and can be expandable to hold and transport a variety of goods. For example, rack member 109 can include a surface on which goods can be placed. Additional surfaces can be attached to increase the area on which goods can be placed.

In some aspects, components of bicycle 100 can be easily sourced (e.g., locally or regionally), which can minimize assembly costs. Greater access to parts can facilitate home or local repairs, which can also increase access to maintenance and minimize repair costs. This can be especially important in remote locations. Additionally, materials used can be such that repairs are infrequently needed. In an aspect, some or all of the components of frame 106 can be made of or reinforced by materials to provide durability (e.g., strength, stability, resilience, rust deterrence). In an aspect, frame 106 can comprise metal, plastic, or a composite material, and/or combinations thereof, including, for example, steel, aluminum, titanium, carbon fiber, plastic, bamboo, etc. Frame 106 can be particularly strong to allow support and transmission of large loads. Additionally, some or all of the components of frame 106 can be modular and reusable such that the components can be assembled into a second bicycle 100 or another device.

Figure 2:
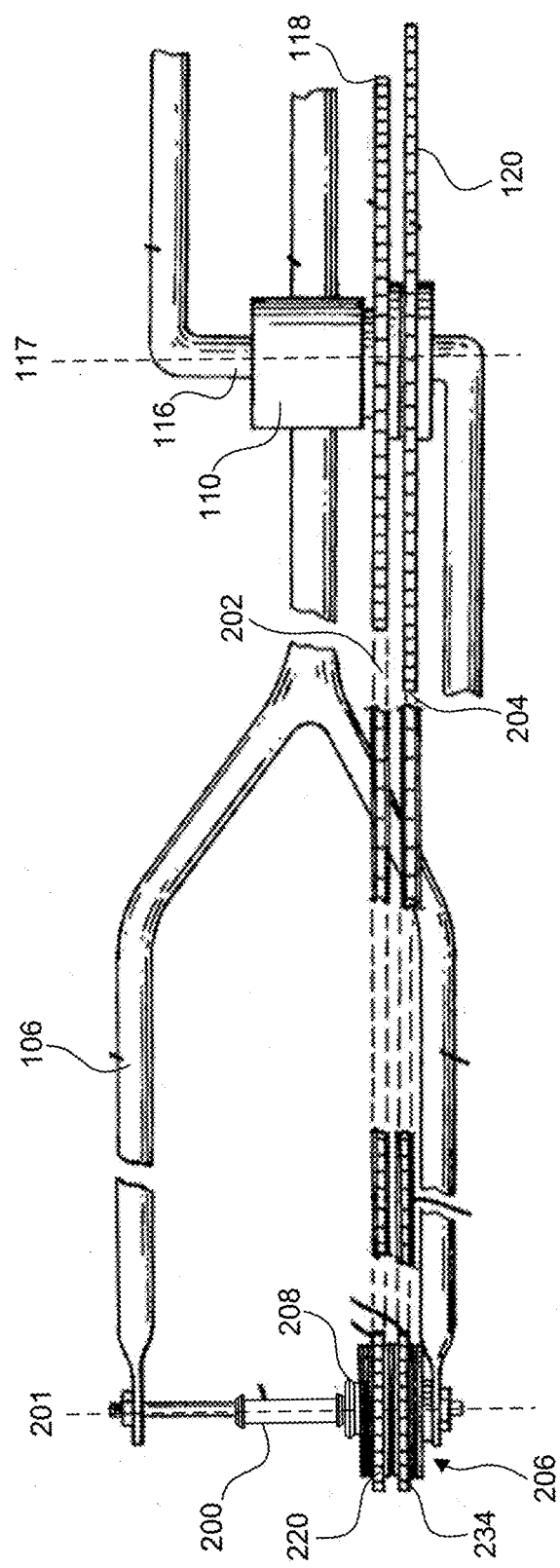
FIG. 2 is a top view of a transmission according to various aspects of the invention.

Referring now to FIGS. 1-2, in some aspects, a transmission for bicycle 100 can include a pedal shaft hub 110, a first pedal 112, a second pedal 114, a pedal shaft 116, a first pedal drive sprocket 118, a second pedal drive sprocket 120, a rear wheel hub 200, a first chain 202, a second chain 204, multi-speed freewheel 206, a first sprocket 220, and second sprocket 234. First pedal 112 and second pedal 114 can be used to rotate pedal shaft 116.

Transmission components can interact with one another to provide driving (i.e., motive) force. In some aspects, transmission components provide driving force in one direction. In an aspect, rotating pedal shaft 116 in the drive direction (e.g., the direction that provides driving force) can be a clockwise rotation when viewing, e.g., FIGS. 1-2. In an aspect, rotating pedal shaft 116 in a non-drive direction (e.g., a direction that does not provide driving force) can be a counterclockwise rotation when viewing, e.g., FIGS. 1-2.

With reference to FIG. 2, transmission components can interact with one other to provide driving force. In an aspect, rotating pedal shaft 116 in the drive direction can rotate the transmission components, e.g., first pedal drive sprocket 118, first chain 202, first sprocket 220, second pedal drive sprocket 120, second chain 204, and second sprocket 234, in the drive direction. The transmission components can provide different gear ratios to move rear wheel 104 and propel bicycle 100 in the drive direction. For example, driving force can be provided at a first gear ratio by first sprocket 220 being drivingly engaged with a driver connected to rear wheel 104. Driving force can be provided at a second gear ratio by second sprocket 234 being drivingly engaged with a driver connected to rear wheel 104. When not drivingly engaged, a gear sprocket can be engaged such that it touches but does not provide driving force and can rotate with the transmission components.

In some aspects, rotating pedal shaft 116 in the non-drive direction can rotate the transmission components, e.g., first pedal drive sprocket 118, first chain 202, first sprocket 220, second pedal drive sprocket 120, second chain 204, and second sprocket 234, in the non-drive direction. The transmission can be toggled, for example, by rotating pedal shaft 116 in the non-drive direction a rotational amount required to transition from first sprocket 220 being drivingly engaged with driver 208 to second sprocket 234 being drivingly engaged with driver 208 once pedal shaft 116 and transmission components are rotated in the drive direction.

The first gear ratio can be provided by first sprocket 220, first pedal drive sprocket 118, and first chain 202. The second gear ratio can be provided by second sprocket 234, second pedal drive sprocket 120, and second chain 204. The gear ratio can be determined by the number of teeth of the engaged pedal drive sprocket and the number of teeth of the drivingly engaged gear sprocket. In some aspects, first pedal drive sprocket 118 and second pedal drive sprocket 120 can include a plurality of gear teeth. In an aspect, first pedal drive sprocket 118 can include the same number of gear teeth as second pedal drive sprocket 120. In another aspect, first pedal drive sprocket 118 can include a different number of gear teeth than second pedal drive sprocket 120. For example, second pedal drive sprocket 120 can include more gear teeth than first pedal drive sprocket 118. In an aspect, first pedal drive sprocket 118 can include approximately 27 gear teeth and second pedal drive sprocket 120 can include approximately 44 gear teeth.

As shown in FIG. 2, bicycle 100 can include one or more pedal drive sprockets operatively connected to one or more gear sprockets of a freewheel arranged on the longitudinal axis 201 of rear wheel hub 200 (e.g., first sprocket 220 or second sprocket 234). In an aspect, first pedal drive sprocket 118 can drive first sprocket 220 using first chain 202 and second pedal drive sprocket 120 can drive second sprocket 234 using second chain 204.

In some aspects, first sprocket 220 can be directly driven by first chain 202 that can encircle first sprocket 220 and first pedal drive sprocket 118. Similarly, second sprocket 234 can be directly driven by second chain 204 that can encircle second sprocket 234 and second pedal drive sprocket 120. In some aspects, first chain 202 and/or second chain 204 can be surrounded by a cage or cover to protect first sprocket 220, first pedal drive sprocket 118, second sprocket 234, and/or second pedal drive sprocket 120. In some aspects, the cage can surround all or part of first sprocket 220, first pedal drive sprocket 118, second sprocket 234, and/or second pedal drive sprocket 120 as well. First chain 202 and/or second chain 204 can be arranged such that they can engage with only one sprocket set (i.e., the chains do not move between sprockets). In this way, each sprocket set (first sprocket 220 and first pedal drive sprocket 118, and second sprocket 234 and second pedal drive sprocket 120) can have a dedicated chain, which can create dedicated gear-shifting for multi-speed transmission. First chain 202 and second chain 204 can run generally parallel to each other from first pedal drive sprocket 118 and second pedal drive sprocket 120 to first sprocket 220 and second sprocket 234, respectively.

Pedal shaft 116 can be cylindrically shaped and can be arranged along a longitudinal axis 117 of pedal shaft hub 110. In an aspect, pedal shaft 116 can support first pedal 112 and second pedal 114. In some aspects, bicycle 100 can include one or more pedal drive sprockets. For example, a first pedal drive sprocket 118 and a second pedal drive sprocket 120 can be mounted onto pedal shaft 116 and/or arranged on one side of pedal shaft hub 110 along the longitudinal axis 117 (e.g., the left side or the right side when viewing FIG. 2 from the top). First pedal drive sprocket 118 and second pedal drive sprocket 120 can be axially arranged in close relation on pedal shaft 116. In an aspect, first pedal drive sprocket 118 can be arranged adjacent to pedal shaft hub 110 on pedal shaft 116. In an aspect second pedal drive sprocket 120 can be positioned adjacent and outside first pedal drive sprocket 118 along longitudinal axis 117 of pedal shaft 116.

In some aspects, multi-speed freewheel 206 can be arranged along a longitudinal axis 201 of rear wheel hub 200. First sprocket 220 and second sprocket 234 can be axially arranged in close relation to rear wheel hub 200 and can be aligned with first pedal drive sprocket 118 and second pedal drive sprocket 120, respectively.

Figure 3:
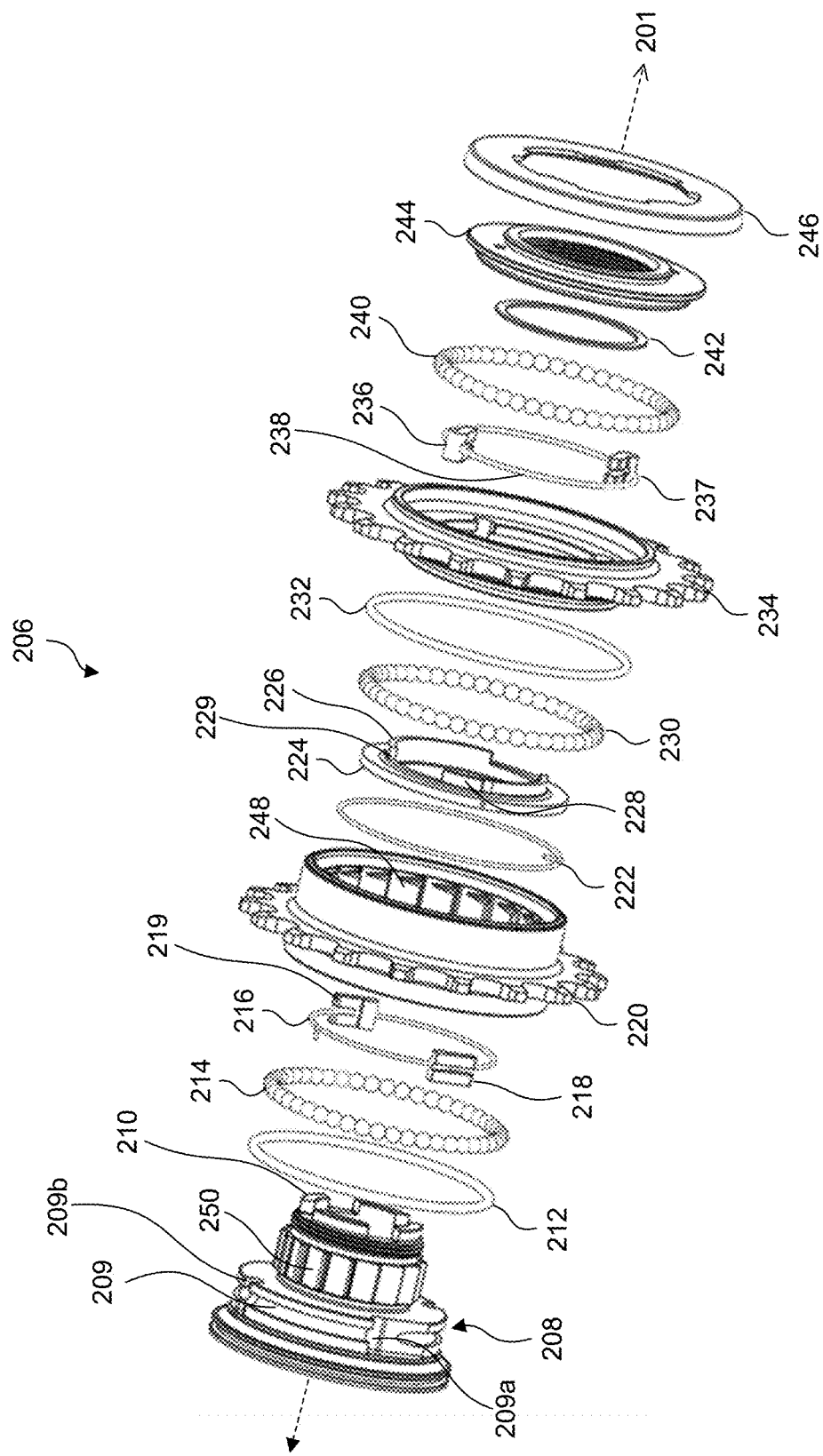
FIG. 3 is an exploded view of a multi-speed freewheel according to various aspects of the invention.

As shown in FIG. 3, multi-speed freewheel 206 can include driver 208, seal 212, bearing 214, first pawl bias member 216, first sprocket 220, friction element 222, shift ring 224 (e.g., a transmitting sprocket), extended surface 226 of shift ring 224, a bearing 230, a seal 232, second sprocket 234, a second pawl bias member 238, a bearing 240, a bearing shim 242, bearing cap 244, and/or a shield 246. Driver 208 can include a plurality of teeth 250 (e.g., drive teeth), groove 209 (e.g., a drive groove), and a removal tool interface 210. Pawl bias member 216 can include one or more of a pawl 218 (e.g., first gear ratio engaging pawl) and a pawl 219 (e.g., first gear ratio engaging pawl). First sprocket 220 can include a plurality of teeth 248 (e.g., drive teeth). Shift ring 224 can include extended surface 226 having one or more notches 228 and an end 229. Second pawl bias member 238 can include one or more of a pawl 236 (e.g., second gear ratio engaging pawl) and a pawl 237 (e.g., second gear ratio engaging pawl).

Driving force can be provided by one of first sprocket 220 or second sprocket 234 drivingly engaging with driver 208. Driving engagement can transmit torque from, e.g., first sprocket 220 or second sprocket 234, to rear wheel 104. Multi-speed freewheel 206 components can interact with one or more gear sprockets to provide the driving engagement and driving force. In an aspect, driving force can be provided at a first gear ratio by first sprocket 220 being drivingly engaged with driver 208. The torque can be transmitted from first sprocket 220 to driver 208 by teeth 248. In this aspect, pawl 218 and/or pawl 219 can be drivingly engaged with teeth 248 of first sprocket 220 and one of groove recesses 209a, 209b, respectively. Alternatively, driving force can be provided at a second gear ratio by second sprocket 234 being drivingly engaged with teeth 250 of driver 208. In this aspect, pawl 236 and/or pawl 237 can be drivingly engaged to teeth 250 of driver 208 and end 229 of extended surface 226. The torque can be transmitted from second sprocket 234 to driver 208 by teeth 250.

Rotating pedal shaft 116 can rotate the transmission components and multi-speed freewheel 206 components. When not drivingly engaged to provide driving force to rear wheel 104, multi-speed freewheel 206 components can be drivingly engaged to other components. For example, when first sprocket 220 is drivingly engaged to driver 208, second sprocket 234 can be drivingly engaged to shift ring 224 such that it does not provide driving force to driver 208 but can rotate with shift ring 224 at the second gear ratio. Similarly, multi-speed freewheel 206 components can be engaged, but not drivingly engaged to rear wheel 104 or a component of multi-speed freewheel 206. For example, when second sprocket 234 is drivingly engaged to driver 208, first sprocket 220 can be engaged, but not drivingly engaged, to driver 208 such that first sprocket 220 can rotate in the drive direction at the first gear ratio. In this aspect, first sprocket 220 does not provide the driving force to driver 208 because the rotation of first sprocket 220 at the first gear ratio is slower than rotation of second sprocket 234 at the second gear ratio. Other components of multi-speed freewheel 206 can be touching, but not drivingly engaged or engaged.

In some aspects, driver 208 can be removably coupled to rear wheel hub 200, for example by a threaded connection. Driver 208 can be arranged on its central axis along the longitudinal axis 201 of rear wheel hub 200. In an aspect, first sprocket 220 and second sprocket 234 can be positioned about driver 208 such that driver 208 can directly support first sprocket 220 and indirectly support second sprocket 234 (e.g., through bearing 230, bearing 240, and/or bearing shim 242). Groove 209 and teeth 250 can be radially arranged on driver 208 such that groove 209 is axially spaced from teeth 250.

In some aspects, seal 212, bearing 214, first pawl bias member 216, pawl 218, and pawl 219 can be arranged along the longitudinal axis 201 of rear wheel hub 200 such that seal 212, bearing 214, first pawl bias member 216, pawl 218, and pawl 219 can be positioned about the portion of driver 208 within an interior area of first sprocket 220. In an aspect, first pawl bias member 216 can be positioned within groove 209 and at least one of pawl 218 and pawl 219 can be positioned in groove recesses 209a, 209b, respectively. At least one of pawl 218 and pawl 219 can engage one or more of teeth 248 of first sprocket 220 to engage and/or drivingly engage driver 208.

Shift ring 224 can include extended surface 226 having end 229 and notches 228 to selectively transmit torque from multi-speed freewheel 206 to rear wheel 104. Extended surface 226 can be positioned within an interior area of second sprocket 234. Since shift ring 224 can be positioned about driver 208, it can also be positioned about teeth 250 of driver 208.

In some aspects, second pawl bias member 238, pawl 236, pawl 237, bearing 240, and seal 232 can be arranged along longitudinal axis 201 of rear wheel hub 200 such that second pawl bias member 238, pawl 236, pawl 237, bearing 240, and seal 232 can be positioned about a portion of driver 208 within an interior area of second sprocket 234.

In some aspects, friction element 222 and shift ring 224 can be arranged along the longitudinal axis 201 of rear wheel hub 200. Friction element 222 and shift ring 224 can be positioned about the portion of driver 208 within an interior area of first sprocket 220. In some aspects, friction element 222 and shift ring 224 can be radially aligned such that friction element 222 can be positioned in an outer edge of shift ring 224. Shift ring 224 and friction element 222 can be positioned about the portion of driver 208 having a portion within an interior area of first sprocket 220. In an aspect, shift ring 224 and friction element 222 can be drivingly engaged to first sprocket 220 such that shift ring 224 and friction element 222 are coupled to first sprocket 220. In this aspect, second sprocket 234 can rotate in the non-drive direction relative to shift ring 224 and engage with teeth 250 of driver 208 and end 229 of extended surface 226. In this aspect, when pedal shaft 116 and the transmission components are rotated in the drive direction, pawl 236 and/or pawl 237 can be drivingly engaged with teeth 250 and end 229 such that second sprocket 234 can drivingly engage with driver 208 (i.e., torque is transmitted from second sprocket 234 to driver 208) to drive rear wheel 104 and propel bicycle 100 in the drive direction.

In another aspect, shift ring 224 and friction element 222 can be engaged to first sprocket 220 such that shift ring 224 and friction element 222 are not coupled to first sprocket 220. In some aspects, when pedal shaft 116 and the transmission components are rotated in the drive direction, pawl 236 and pawl 237 cannot be drivingly engaged with teeth 250 and end 229 and second sprocket 234 cannot drivingly engage with driver 208 to move rear wheel 104 and propel bicycle 100 in the drive direction. In this aspect, pawl 218 and/or pawl 219 can be drivingly engaged with teeth 248 such that driver 208 is drivingly engaged to first sprocket 220 (i.e., torque is transmitted from first sprocket 220 to driver 208) and rear wheel 104 can be moved and bicycle 100 can be propelled in the drive direction at the first gear ratio.

In some aspects, bearing cap 244 can be removably secured to driver 208 (e.g., bearing cap 244 can thread onto driver) to cover the respective components of multi-speed freewheel 206. Bearing shim 242 can be positioned about driver 208 and axially closer to first sprocket 220 than bearing cap 244. In an aspect, bearing shim 242 can be axially closer to bearing cap 244 than to first sprocket 220. In an aspect, bearing shim 242 can secure bearing cap 244 and apply a set or adjustable preload (e.g., axially or radially) to one or more bearings arranged over driver 208. In some aspects, multi-speed freewheel 206 can include one or more bearing shims 242. In some aspects, shield 246 can be removably arranged partially or entirely over multi-speed freewheel 206.

Figure 4:
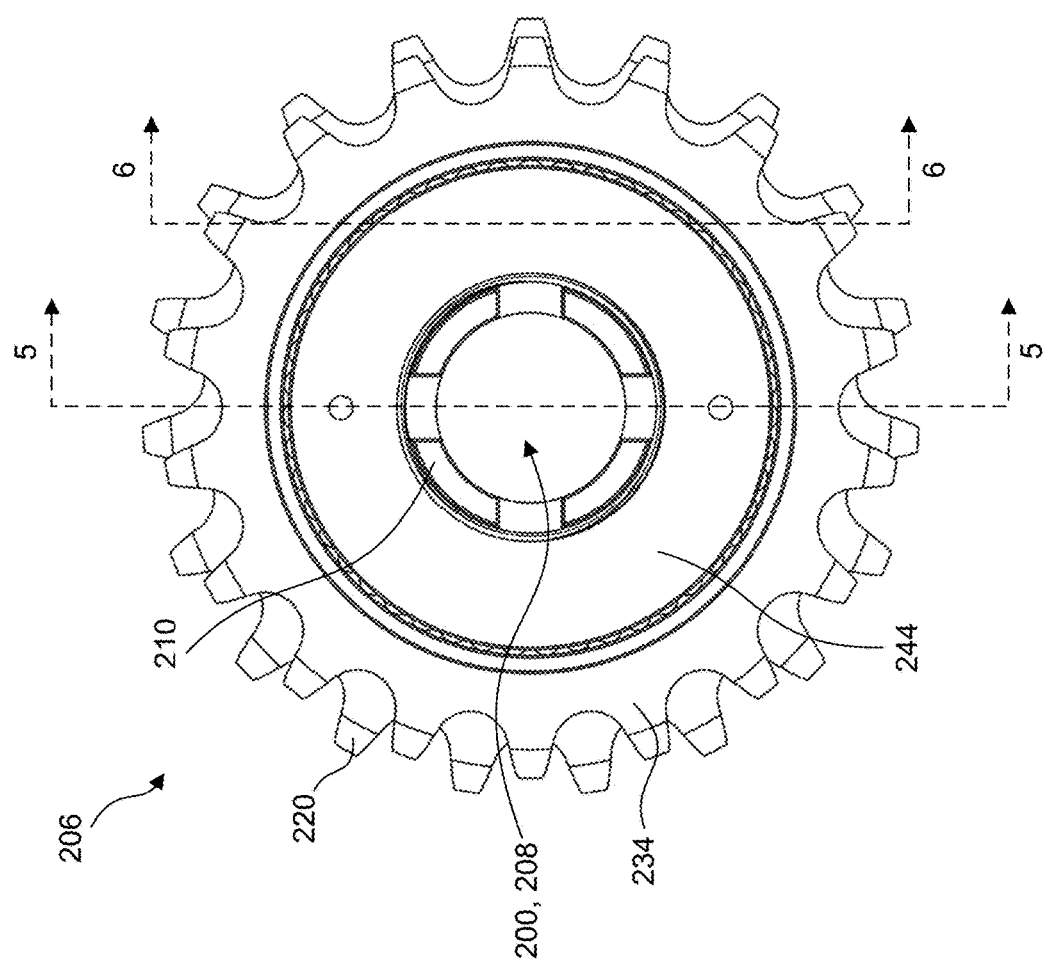
FIG. 4 is a side view of the multi-speed freewheel of FIG. 3 arranged on a longitudinal axis from a second end according to various aspects of the invention.
Figure 5:
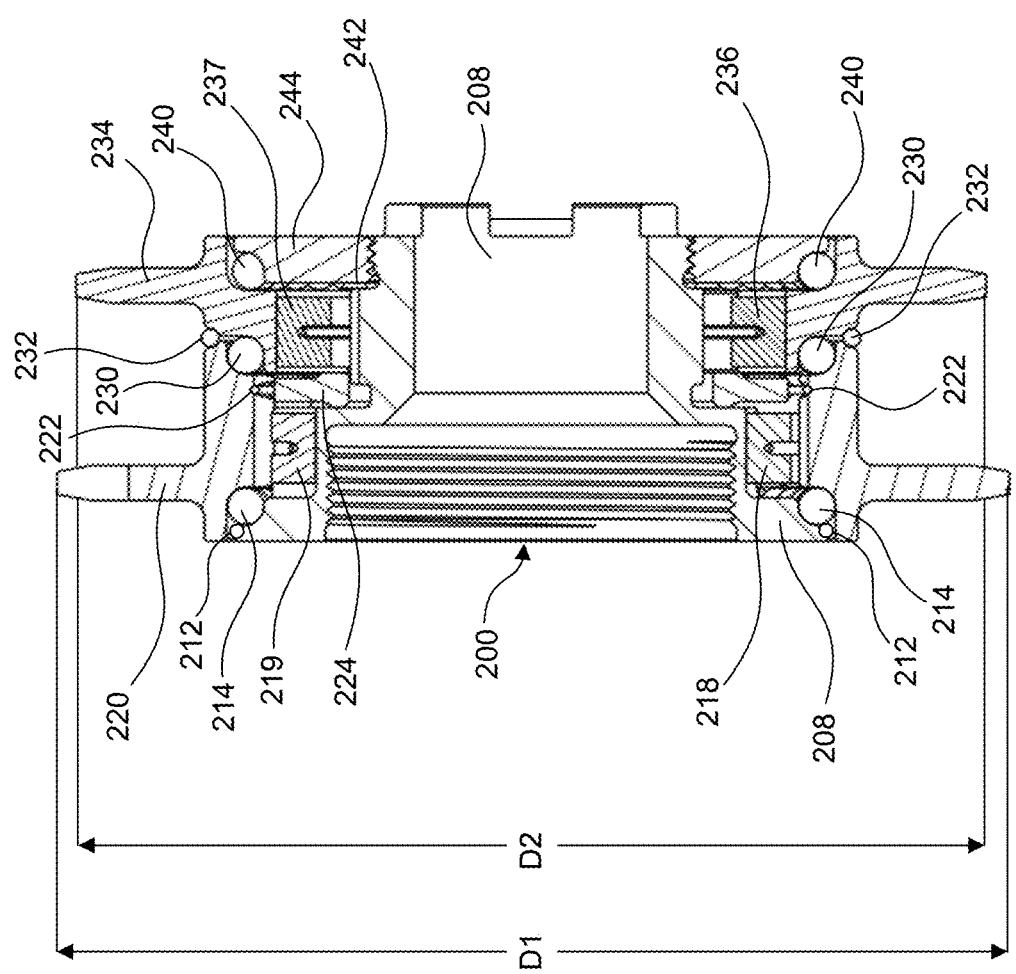
FIG. 5 is a section view along 5-5 of the multi-speed freewheel in FIG. 4 according to various aspects of the invention.
Figure 6:
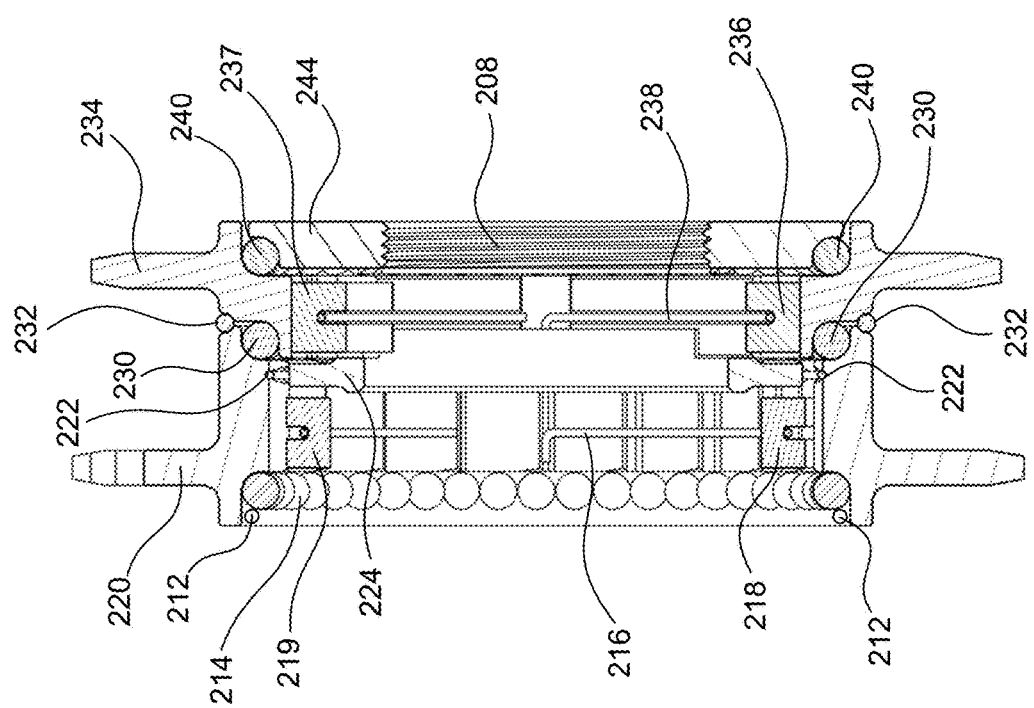
FIG. 6 is a section view along 7-7 of the multi-speed freewheel in FIG. 4 according to various aspects of the invention.

With reference to FIGS. 4-6, rotating pedal shaft 116 in the drive direction rotates sprockets 118/120 and chains 202/204 and in turn first sprocket 220 and second sprocket 234 to provide the driving force for bicycle 100. In some aspects, when pedal shaft 116 is rotated in the non-drive direction, multi-speed freewheel 206 can disengage from rear wheel hub 200. First sprocket 220 or second sprocket 234 can freely rotate about the central axis of driver 208. The transmission can be toggled when pedal shaft 116 and the transmission components are rotated in the non-drive direction a rotational amount required to transition from a first gear being drivingly engaged with driver 208 to a second gear being drivingly engaged with driver 208 (e.g., one-quarter rotation). Since multi-speed freewheel 206 can disengage from rear wheel hub 200 when pedal shaft 116 is rotated in the non-drive direction, the driving force from the pedal drive sprockets to the gear sprockets (by the drive chains) is transferred in only one direction.

In an aspect, friction element 222 can be positioned in an outer edge of shift ring 224 such that they are coupled together. In this aspect, rotation can be locked between friction element 222 and shift ring 224. In some aspects, the arrangement of bearing shim 242 can enable driver 208 to support the free rotation of first sprocket 220 and/or second sprocket 234 about the central axis of driver 208.

In an aspect, at least one of pawl 218 and pawl 219 can be engaged with teeth 248, which can be radially arranged within an interior area of first sprocket 220. In an aspect, bearing 214 can provide rotational support to first sprocket 220 and can be sealed. For example, seal 212 can be provided to retain lubricant in bearing 214 and/or prevent external contamination of bearing 214 and/or other components of multi-speed freewheel 206. In an aspect, bearing 214 can be a roller bearing (e.g., tapered, cylindrical, or needle) that can enable driver 208 to support the free rotation of first sprocket 220 about longitudinal axis 201 and resolve any remaining system forces.

In an aspect, at least one of pawl 236 and pawl 237 can be positioned within an interior area of second sprocket 234. Second pawl bias member 238 and at least one of pawl 236 and pawl 237 can be positioned around teeth 250 of driver 208. In an aspect, bearing 240 can provide rotational support to second sprocket 234. In an aspect, bearing 240 can be a roller bearing (e.g., tapered, cylindrical, or needle) that can enable driver 208 to support the free rotation of second sprocket 234 about the central axis of driver 208 and resolve any remaining system forces. In some aspects, removal tool interface 210 can be compatible with industry standard tools (e.g., Park Tool FR-4) and can be used to remove multi-speed freewheel 206 from rear wheel hub 200. In an aspect, shield 246 can be provided to retain lubricant in bearing 240 and/or prevent external contamination of bearing 240 and/or other components of multi-speed freewheel 206. In other aspects, shield 246 can protect all or part of multi-speed freewheel 206 from environmental impacts that can aggravate maintenance needs (e.g., rain, wind, dust, etc.).

Shift ring 224 can be arranged along longitudinal axis 201 to facilitate transition from a first gear ratio where first sprocket 220 is drivingly engaged with driver 208 to a second gear ratio where second sprocket 234 is drivingly engaged with driver 208 as pedal shaft 116 and the transmission components are rotated in the drive direction. Extended surface 226 of shift ring 224 can be positioned within an interior area of second sprocket 234 between at least one of pawl 236 and pawl 237. As pedal shaft 116 and the transmission components are rotated in the non-drive direction, multi-speed freewheel 206 can rotate about the longitudinal axis 201. In this aspect, shift ring 224 and friction element 222 can be drivingly engaged to first sprocket 220. Second sprocket 234 can then rotate relative to shift ring 224. As pedal shaft 116 and the transmission components are rotated in the non-drive direction the amount required to transition from the first gear ratio to the second gear ratio (e.g., one-quarter rotation), pawl 236 and/or pawl 237 (i.e., at least one gear pawl on second pawl bias member 238) can engage with teeth 250 of driver 208 and end 229 of extended surface 226. When pedal shaft 116 and the transmission components are rotated in the drive direction, pawl 236 and/or pawl 237 can be drivingly engaged with teeth 250 and end 229 such that rear wheel 104 can be moved and bicycle 100 can be propelled in the drive direction at the second gear ratio.

In this aspect, because first sprocket 220 can provide a first gear ratio at which rotation of first sprocket 220 is slower than rotation of second sprocket 234, pawl 218 and pawl 219 can be engaged with teeth 248 of first sprocket 220 but not drivingly engaged when pedal shaft 116 and the transmission components are rotated in the drive direction. First sprocket 220 does not provide the driving force to propel bicycle 100 because the second sprocket 234 is drivingly engaged at a higher gear ratio with a faster rotation. Because of the faster rotation at the second gear ratio, at least one of pawl 218 and pawl 219 are overdriven. In this aspect, at least one of pawl 218 and pawl 219 can pivot in groove recesses 209a, 209b, respectively, and be overdriven. This arrangement can maintain the axial alignment of first sprocket 220 while moving rear wheel 104 at the second gear ratio.

In other aspects, as pedal shaft 116 and the transmission components are rotated in the non-drive direction, the rotation might not provide for transitioning from the first gear ratio to the second gear ratio. In this aspect, the second gear ratio is not triggered. Instead, extended surface 226 of shift ring 224 blocks the engagement between pawl 236 and/or pawl 237 with teeth 250 and end 229 of extended surface 226. As a result, when pedal shaft 116 and the transmission components are rotated in the drive direction, pawl 236 and pawl 237 cannot be drivingly engaged with teeth 250 and end 229 and second sprocket 234 cannot drivingly engage with driver 208 to move rear wheel 104 and propel bicycle 100 in the drive direction. Instead, pawl 236 and/or pawl 237 can be drivingly engaged with notches 228, not driver 208, and shift ring 224 can rotate in the drive direction with second sprocket 234 at the second gear ratio. In this aspect, pawl 218 and/or pawl 219 can be drivingly engaged with teeth 248 such that driver 208 is drivingly engaged to first sprocket 220 and rear wheel 104 can be moved and bicycle 100 can be propelled in the drive direction at the first gear ratio.

Figure 7:
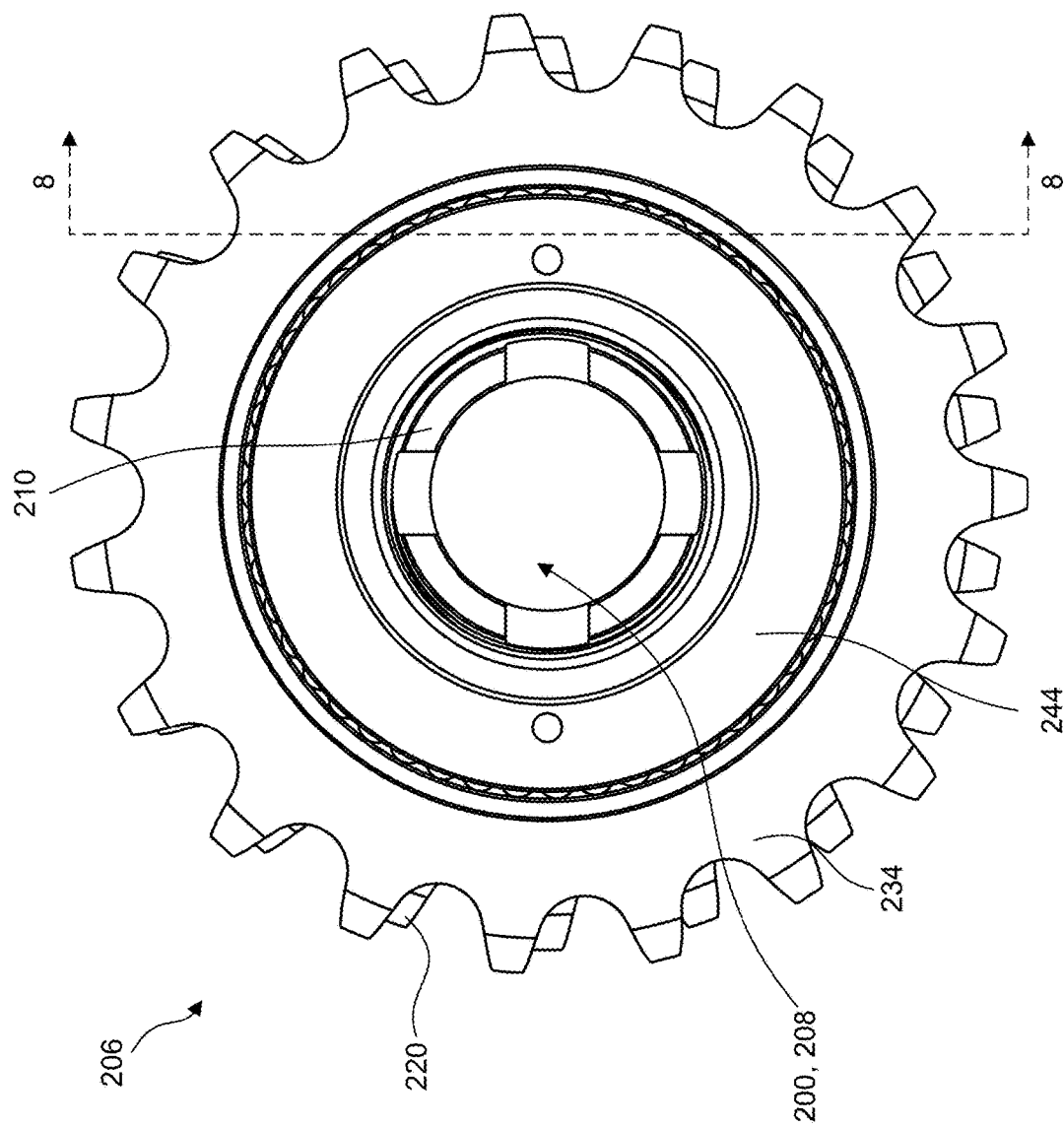
FIG. 7 is a side view of the multi-speed freewheel of FIG. 3 arranged on a longitudinal axis from a second end according to various aspects of the invention.
Figure 8:
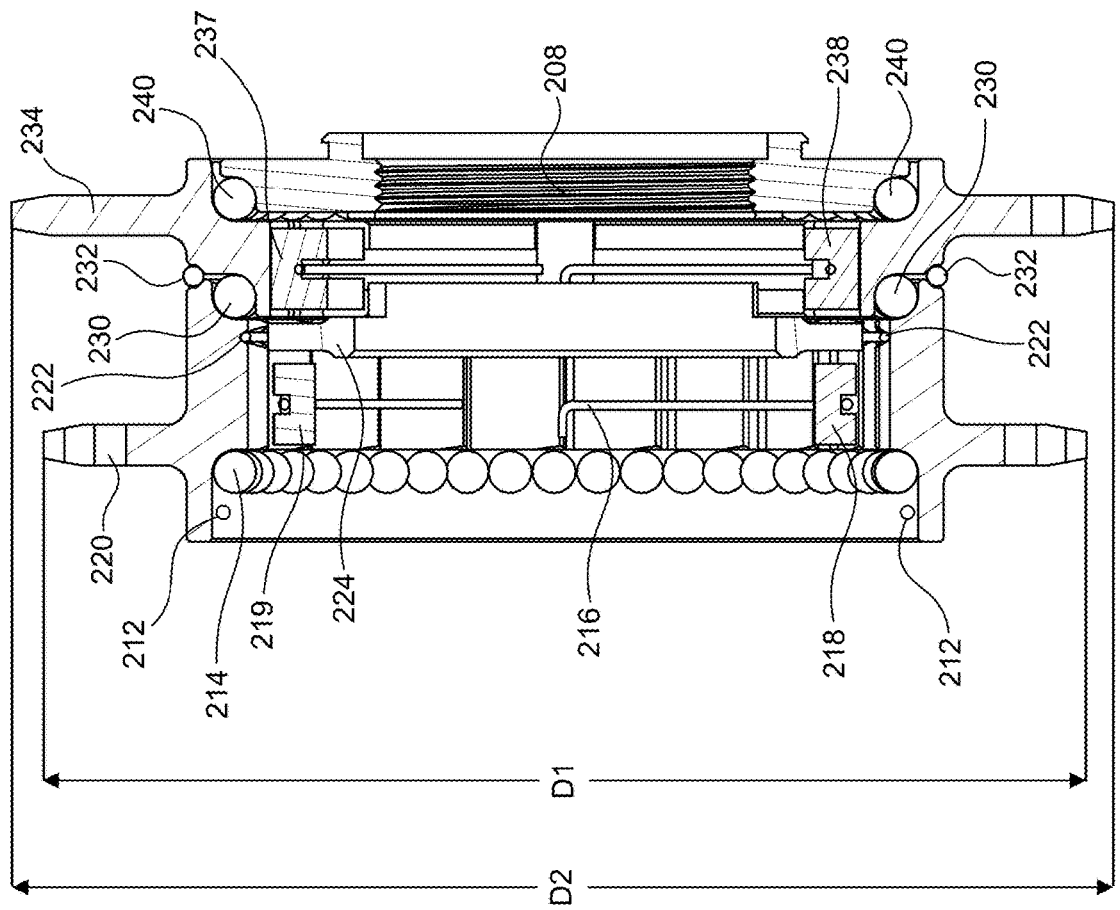
FIG. 8 is a section view along 8-8 of the multi-speed freewheel in FIG. 7 according to various aspects of the invention.
Figure 9:
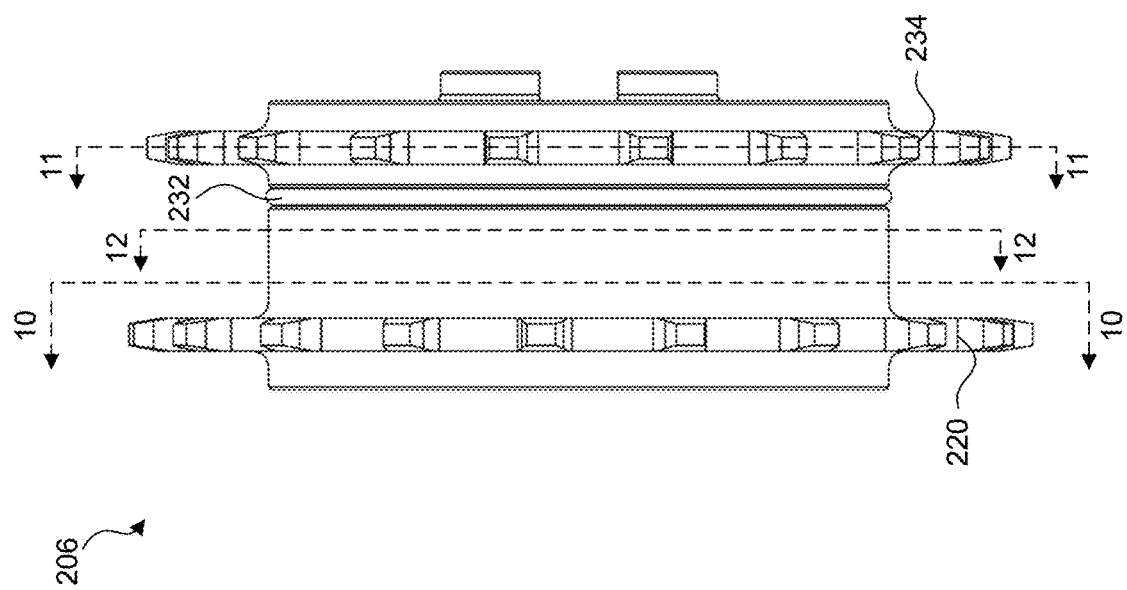
FIG. 9 is a rear view of the multi-speed freewheel of FIG. 3 arranged on a longitudinal axis at a first gear ratio according to various aspects of the invention.

In some aspects, as shown in FIGS. 7-8, first sprocket 220 diameter, D1, can be smaller than second sprocket 234 diameter, D2 and as such, can have a different number of teeth. In an aspect, second sprocket 234 rotates faster than first sprocket 220 because of a higher gear ratio based at least in part on the relative sizes of D1 and D2.

In some aspects, first chain 202 and second chain 204 can differ in size to provide the different gear ratios. Chain and/or sprocket sizes can be selected such that both first chain 202 and second chain 204 can be simultaneously tensioned. Alternatively, commonly known chain tensioners can be used to tension first chain 202 and/or second chain 204.

Figure 10:
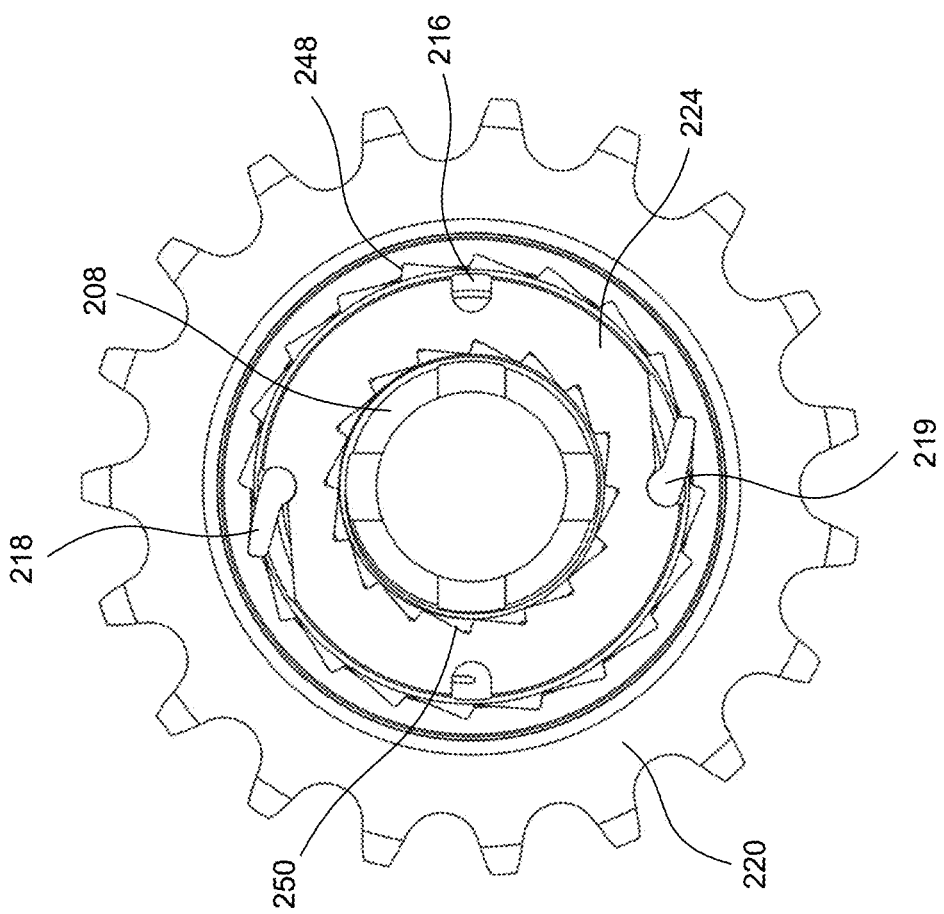
FIG. 10 is a section view along 10-10 of the multi-speed freewheel in FIG. 9 according to various aspects of the invention.

With reference to FIGS. 9-12, in some aspects, rear wheel 104 can be moved and bicycle 100 can be propelled in the drive direction at the first gear ratio. At the first gear ratio, at least one of pawl 218 and pawl 219 can be drivingly engaged with one or more of teeth 248 of first sprocket 220 to move rear wheel 104 and propel bicycle 100 in the drive direction. As shown in FIG. 10, in an aspect, teeth 248 of first sprocket 220 can be radially arranged on first sprocket 220. At least one of pawl 218 and pawl 219 positioned in groove recesses 209a, 209b on driver 208 can be engaged with first pawl bias member 216, which can bias pawl 218 and pawl 219 (e.g., concurrently or separately) toward one or more teeth 248 of first sprocket 220 (e.g., via metal springs, elastomeric material, etc.). At least one of pawl 218 and pawl 219 can engage with teeth 248 such that driver 208 is engaged to first sprocket 220. When pedal shaft 116 and the transmission components are rotated in the drive direction, pawl 218 and/or pawl 219 can be drivingly engaged with teeth 248 such that driver 208 is drivingly engaged to first sprocket 220. In this aspect, rear wheel 104 can be moved and bicycle 100 can be propelled in the drive direction at the first gear ratio. In an aspect, at least one of pawl 218 and pawl 219 can pivot in groove recesses 209a, 209b, respectively, such that it can be a free-riding pawl and can axially support first sprocket 220. In this aspect, at least one of pawl 218 and pawl 219 can be active in that rear wheel 104 can be moved and bicycle 100 can be propelled in the drive direction at the first gear ratio.

Figure 11:
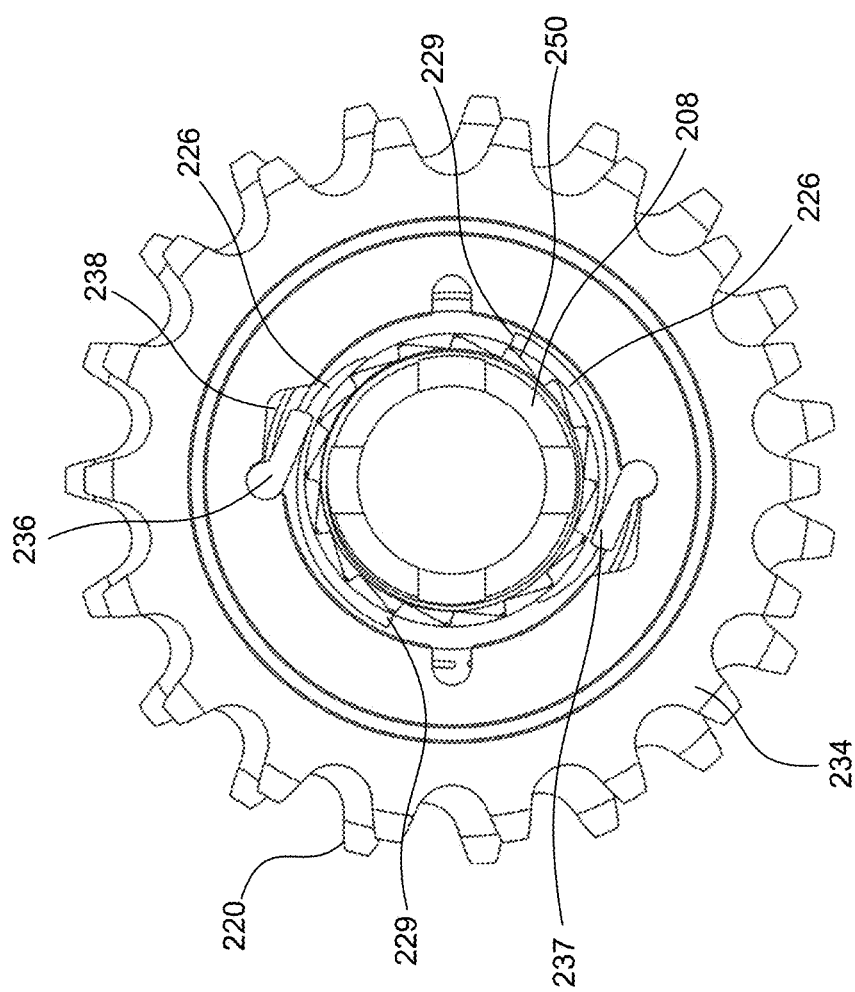
FIG. 11 is a section view along 11-11 of the multi-speed freewheel in FIG. 9 according to various aspects of the invention.

As shown in FIG. 11, at least one of pawl 236 and pawl 237 can be radially arranged within second sprocket 234. At least one of pawl 236 and pawl 237 can be engaged with second pawl bias member 238, which can bias pawl 236 and pawl 237 (e.g., concurrently or separately) toward one or more teeth 250 of driver 208 (e.g., via metal springs, elastomeric material, etc.). At the second gear ratio, at least one of pawl 236 and pawl 237 can be biased toward teeth 250 such that second sprocket 234 can be engaged with teeth 250 of driver 208 and end 229 of extended surface 226. When in the first gear ratio, pawl 236 and pawl 237 cannot engage with teeth 250 and end 229 of extended surface 226. As a result, when pedal shaft 116 and the transmission components are rotated in the drive direction, pawl 236 and pawl 237 cannot be drivingly engaged with teeth 250 and end 229 and second sprocket 234 cannot drivingly engage with driver 208 to move rear wheel 104 and propel bicycle 100 in the drive direction. In this aspect, pawl 218 and/or pawl 219 can be drivingly engaged with teeth 248 such that driver 208 is drivingly engaged to first sprocket 220 and rear wheel 104 can be moved and bicycle 100 can be propelled in the drive direction at the first gear ratio. In this aspect, at least one of pawl 236 and pawl 237 can instead be engaged with notches 228 of shift ring 224 such that at least one of pawl 236 and pawl 237 can be drivingly engaged with shift ring 224. At the first gear ratio, at least one of pawl 236 and pawl 237 can drive shift ring 224 in the drive direction at the second gear ratio provided by second sprocket 234 (at the speed of the second sprocket 234) and can be inactive (i.e., prevented from drivingly engaging with driver 208).

Figure 12:
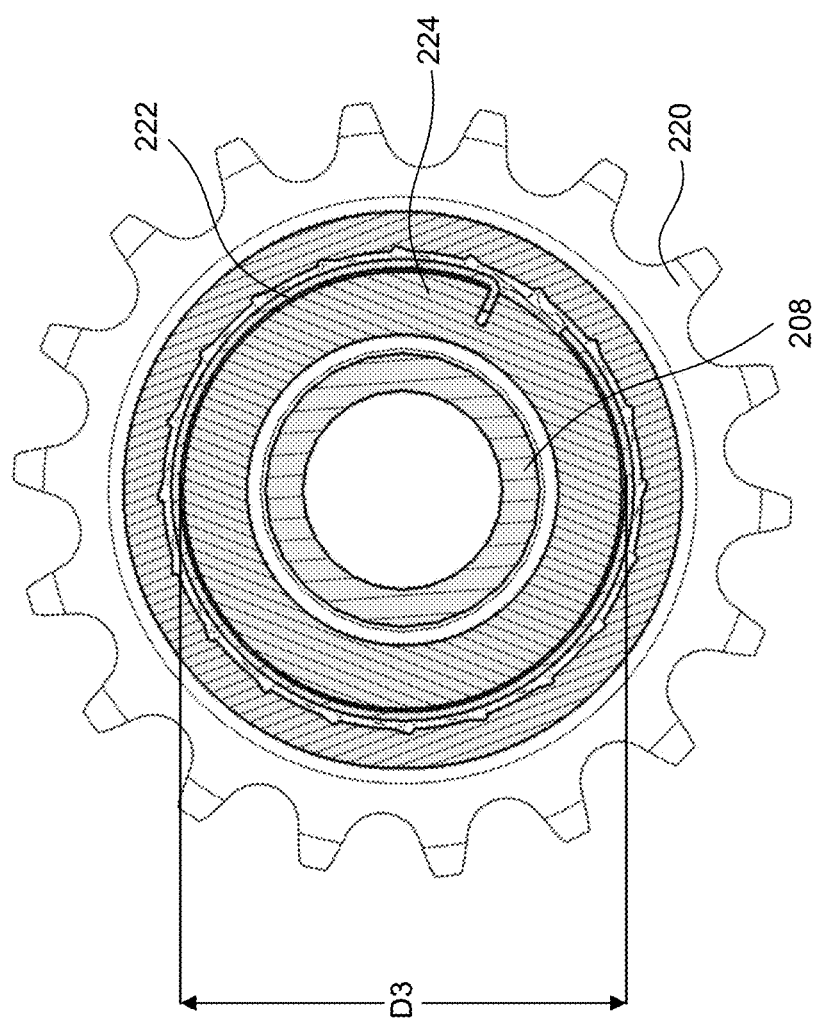
FIG. 12 is a section view along 12-12 of the multi-speed freewheel in FIG. 9 according to various aspects of the invention.
Figure 13:
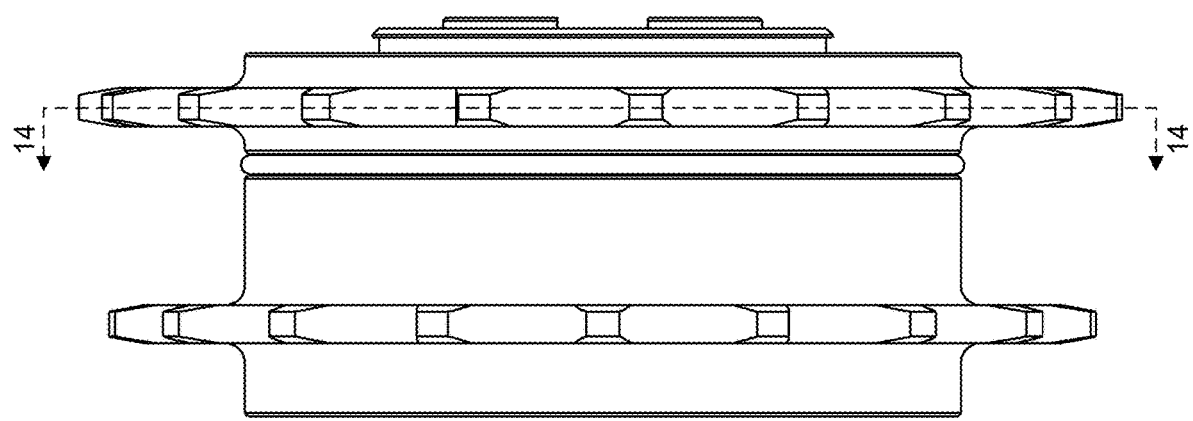
FIG. 13 is a rear view of the multi-speed freewheel of FIG. 3 arranged on a longitudinal axis transitioning from drivingly engaging at a first gear ratio to a second gear ratio according to various aspects of the invention.
Figure 14:
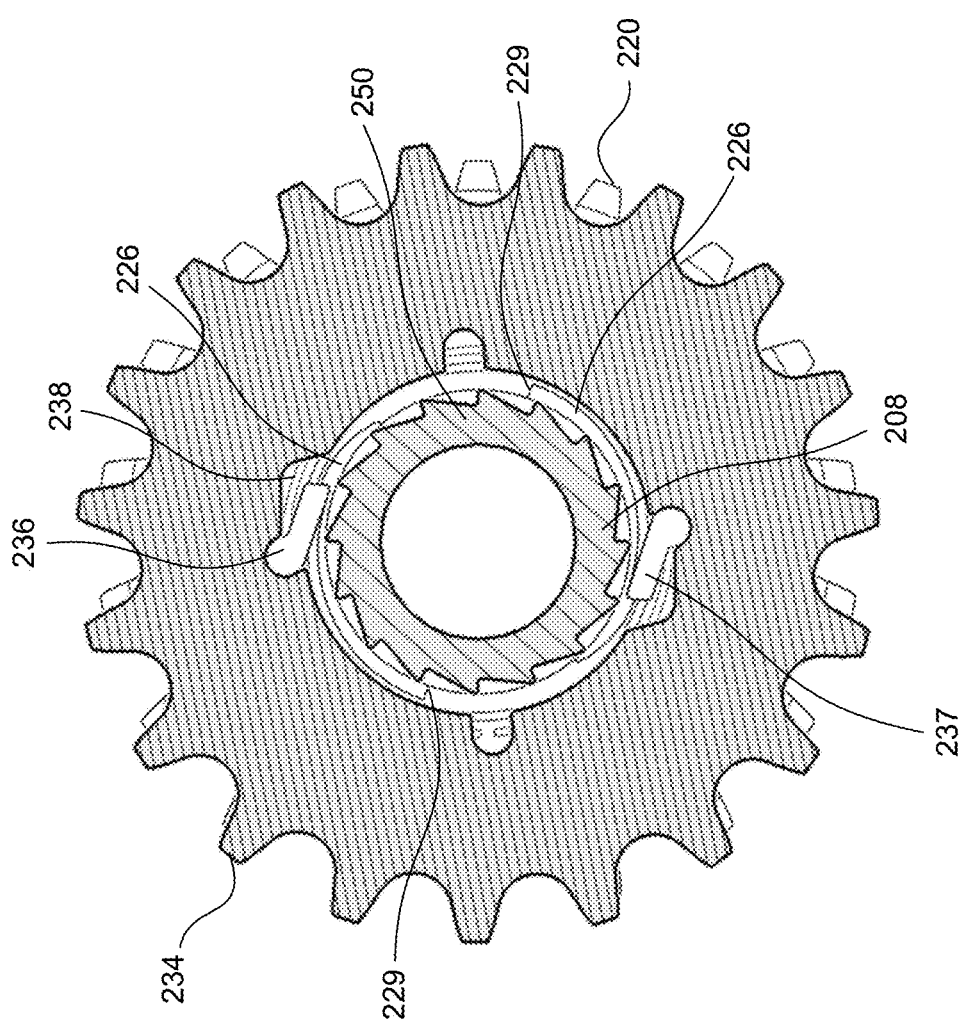
FIG. 14 is a section view along 14-14 of the multi-speed freewheel in FIG. 13 according to various aspects of the invention.
Figure 15:
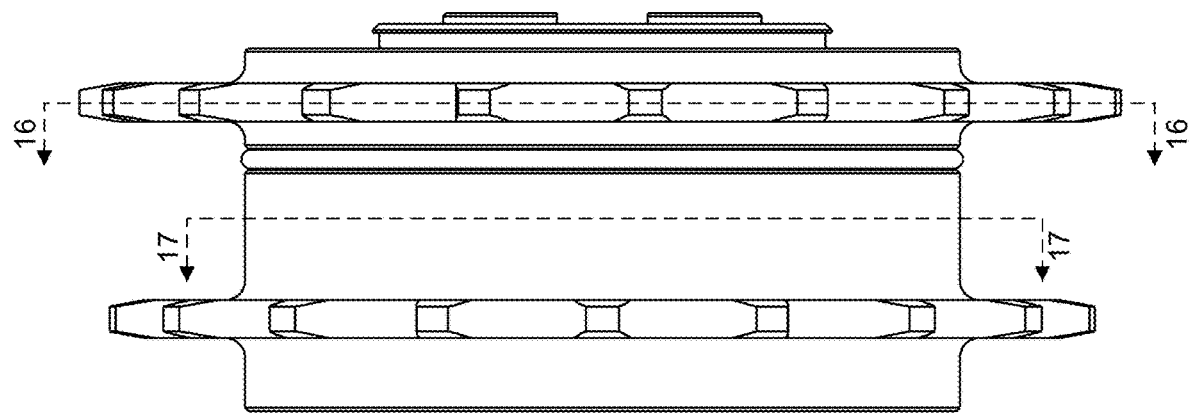
FIG. 15 is a rear view of the multi-speed freewheel of FIG. 3 arranged on a longitudinal axis transitioning from drivingly engaging at a first gear ratio to a second gear ratio according to various aspects of the invention.
Figure 16:
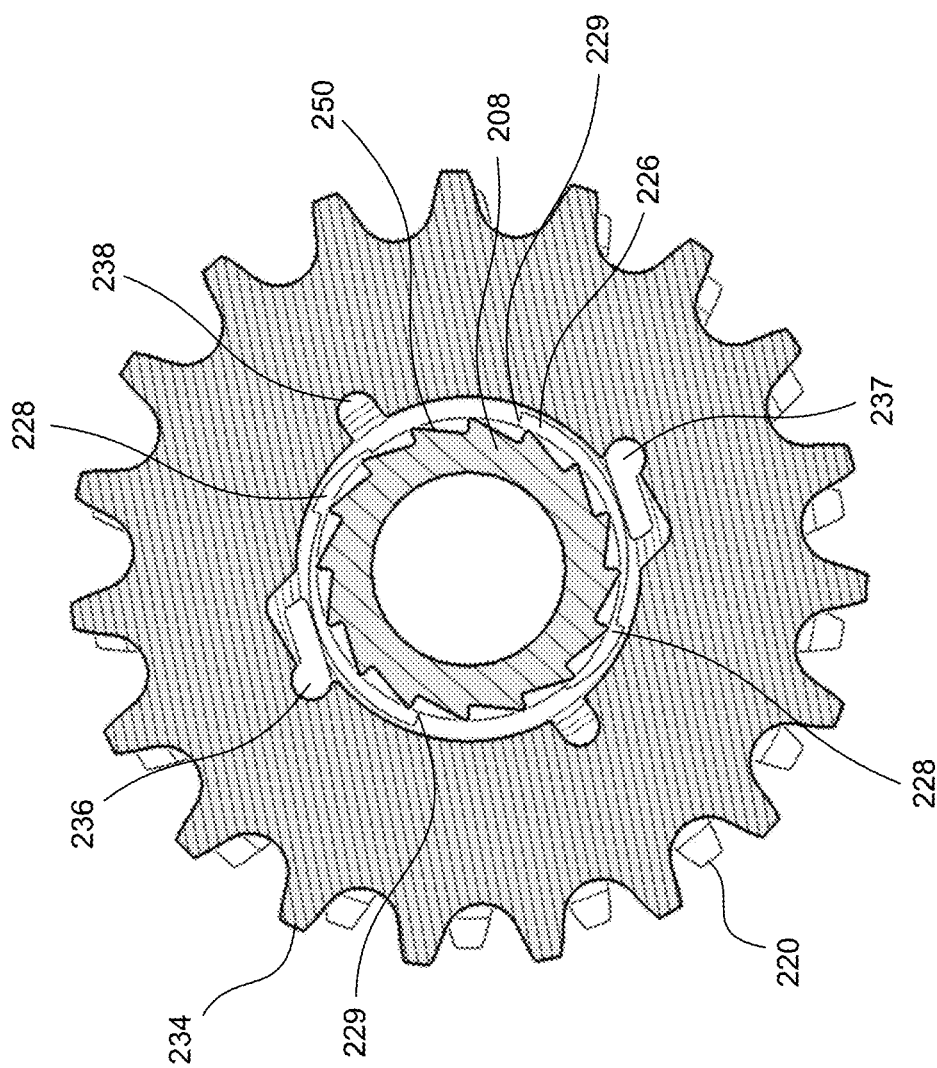
FIG. 16 is a section view along 16-16 of the multi-speed freewheel in FIG. 15 according to various aspects of the invention.

As shown in FIG. 12, rotating pedal shaft 116 and the transmission components in the drive direction can cause rotation in the drive direction of shift ring 224 since at least one of pawl 236 and pawl 237 can drivingly engage with shift ring 224 by notches 228. The rotation in the drive direction of shift ring 224 can decrease the diameter, D3, of friction element 222, reducing the friction forces and decoupling shift ring 224 and friction element 222 from first sprocket 220.

With reference to FIGS. 13-17, multi-speed freewheel 206 can transition from the first gear ratio with first sprocket 220 drivingly engaged with driver 208 to the second gear ratio with second sprocket 234 drivingly engaged with driver 208. In some aspects, as pedal shaft 116 and the transmission components are rotated in the non-drive direction, multi-speed freewheel 206 can transition the first gear ratio to the second gear ratio. In some aspects, as pedal shaft 116 and the transmission components are rotated in the non-drive direction, at least one of pawl 236 and pawl 237 of second sprocket 234 can continually engage and disengage notches 228 of shift ring 224, end 229 of extended surface 226, and teeth 250 of driver 208. Accordingly, the transmission can continually be toggled between the first gear ratio and the second gear ratio.

Figure 17:
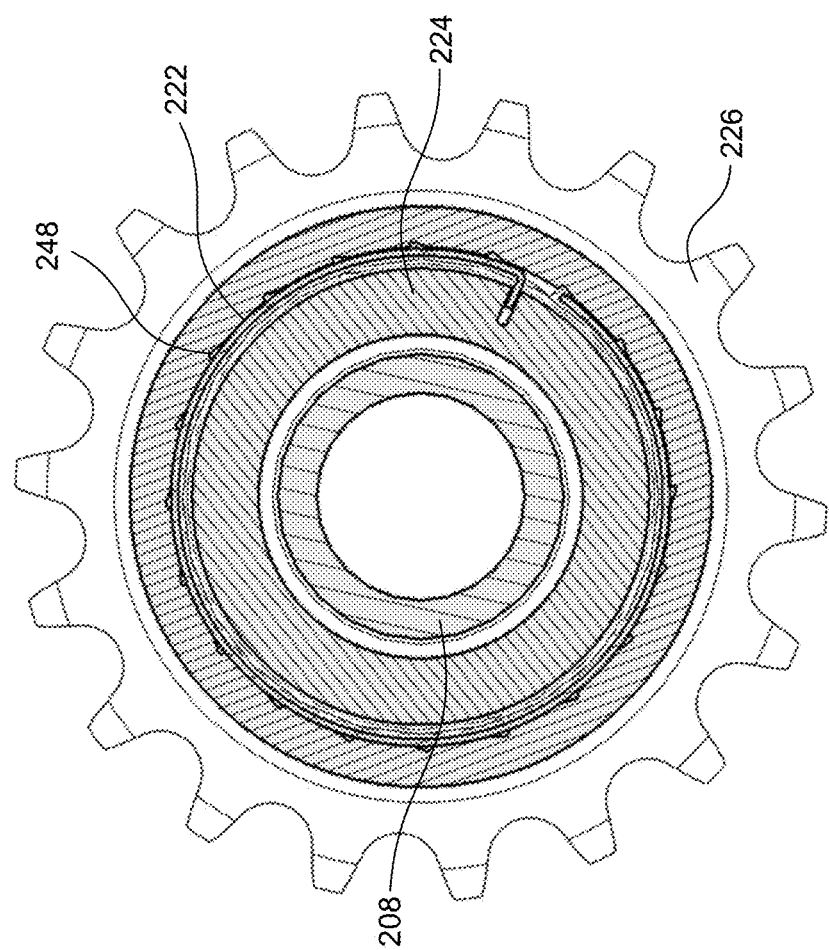
FIG. 17 is a section view along 17-17 of the multi-speed freewheel in FIG. 15 according to various aspects of the invention.
Figure 18:
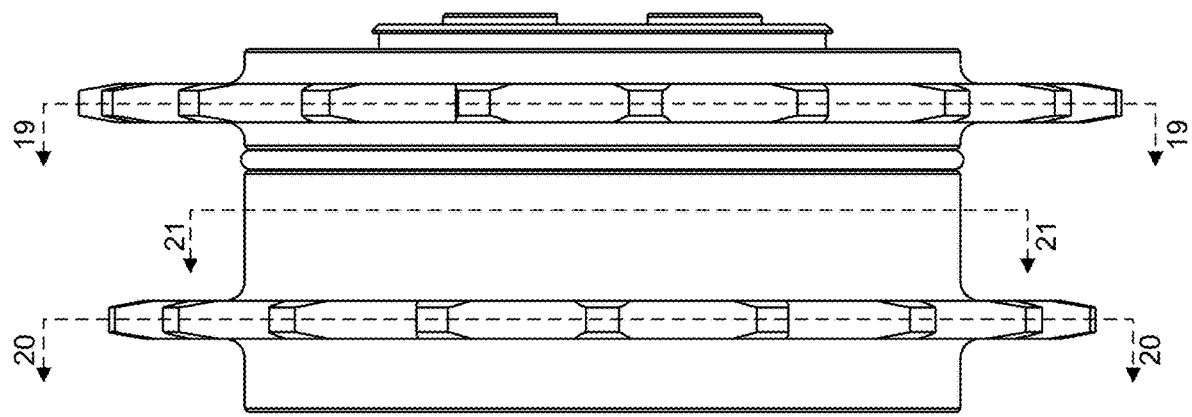
FIG. 18 is a rear view of the multi-speed freewheel of FIG. 3 arranged on a longitudinal axis at a second gear ratio according to various aspects of the invention.

As shown in FIG. 17, rotating pedal shaft 116 and the transmission components in the non-drive direction can cause the rotation in the non-drive direction of shift ring 224 because shift ring 224 can be coupled to first sprocket 220. The rotation in the non-drive direction of shift ring 224 can increase the diameter, D3, of friction element 222, increasing the friction forces and coupling shift ring 224 and friction element 222 to first sprocket 220.

Pawl 236 and pawl 237 rotates in the non-drive direction at the second gear ratio faster than shift ring 224 coupled to first sprocket 220, which rotates at the first gear ratio. This can cause pawl 236 and pawl 237 to rotate relative to shift ring 224. As a result, pawl 236 and/or pawl 237 can advance away from notches 228 and extended surface 226. At least one of pawl 236 and pawl 237 can be engaged with second pawl bias member 238, which can bias pawl 236 and pawl 237 (e.g., concurrently or separately) toward one or more teeth 250 (e.g., via metal springs, elastomeric material, etc.). At a predetermined rotation, at least one of pawl 236 and pawl 237 can be biased toward teeth 250 of driver 208 and can engage with teeth 250 and end 229 of extended surface 226 on shift ring 224. In this aspect, when pedal shaft 116 and the transmission components are rotated in the drive direction, pawl 236 and/or pawl 237 can be drivingly engaged with teeth 250 and end 229 such that second sprocket 234 can drivingly engage with driver 208 to drive rear wheel 104 and propel bicycle 100 in the drive direction at the second gear ratio.

Figure 19:
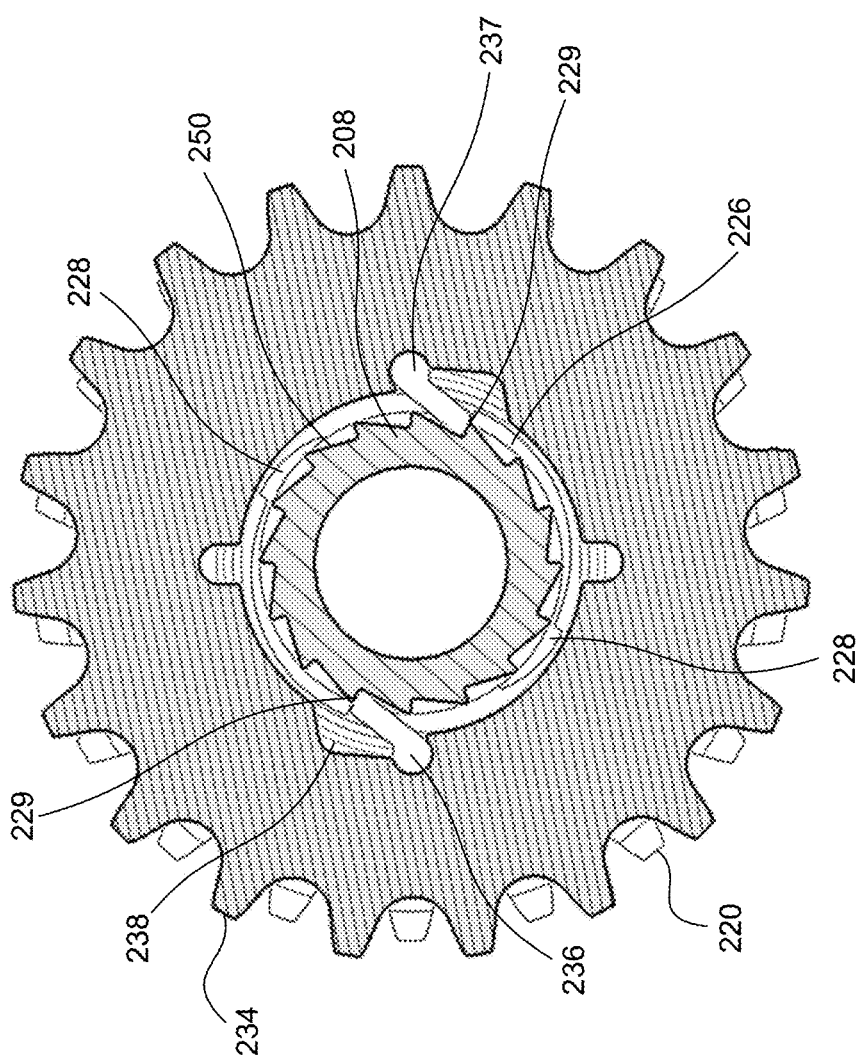
FIG. 19 is a section view along 19-19 of the multi-speed freewheel in FIG. 18 according to various aspects of the invention.

With reference to FIGS. 18-21, in some aspects, bicycle 100 can propel in the drive direction at the second gear ratio. At least one of the pawl 236 and pawl 237 can be active at the second gear ratio, such that at least one of pawl 236 and pawl 237 can drive rear wheel 104 and propel bicycle 100 in the drive direction. As shown in FIG. 19, in an aspect, at least one of pawl 236 and pawl 237 can drivingly engage with teeth 250 of driver 208 and end 229 of extended surface 226 at the second gear ratio.

Figure 20:
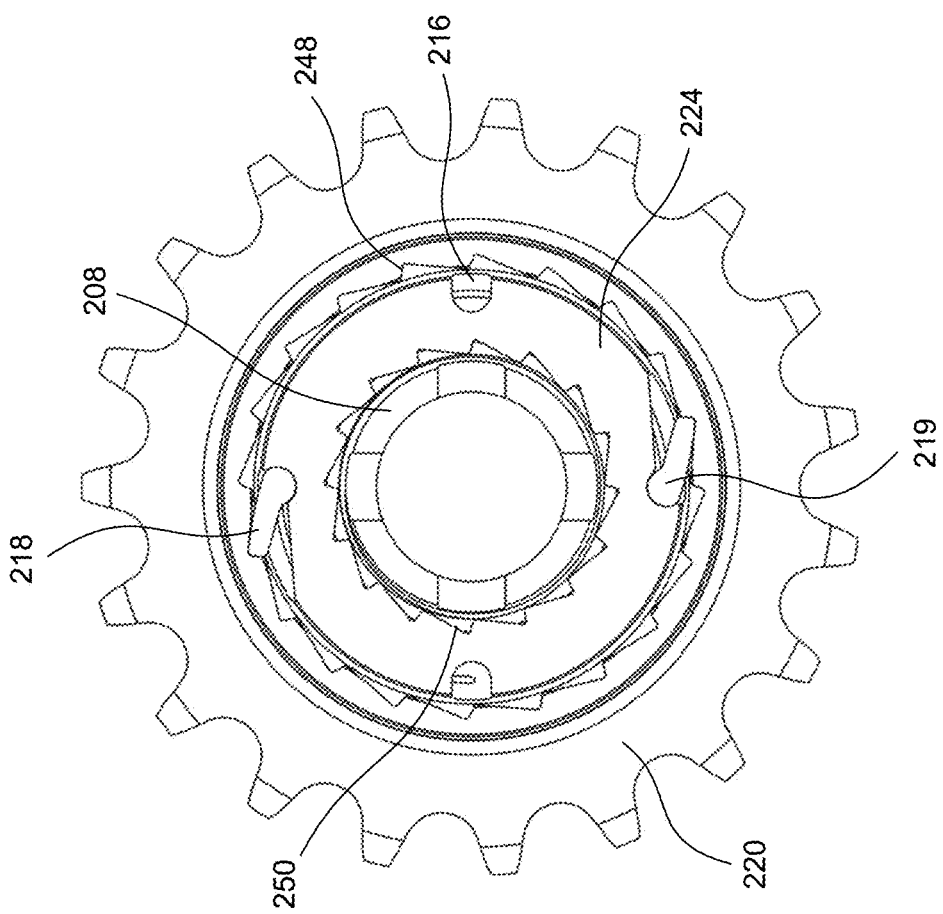
FIG. 20 is a section view along 20-20 of the multi-speed freewheel in FIG. 18 according to various aspects of the invention.

As shown in FIG. 20, in some aspects, at the second gear ratio, at least one of pawl 218 and pawl 219 can be engaged, but not drivingly engaged, with teeth 248 of first sprocket 220. In the second gear ratio, at least one of pawl 236 and pawl 237 can be drivingly engaged with teeth 250 and end 229 of extended surface 226 and the second sprocket 234 can move rear wheel 104 and propel bicycle 100 in the drive direction. Because the second sprocket 234 is drivingly engaged with driver 208 at a higher gear ratio with a faster rotation than first sprocket 220, pawl 218 and/or pawl 219 are overdriven into groove recesses 209a, 209b such that pawl 218 and pawl 219 can be engaged with teeth 248 but not drivingly engaged to provide the driving force to move rear wheel 104 and propel bicycle 100.

Figure 21:
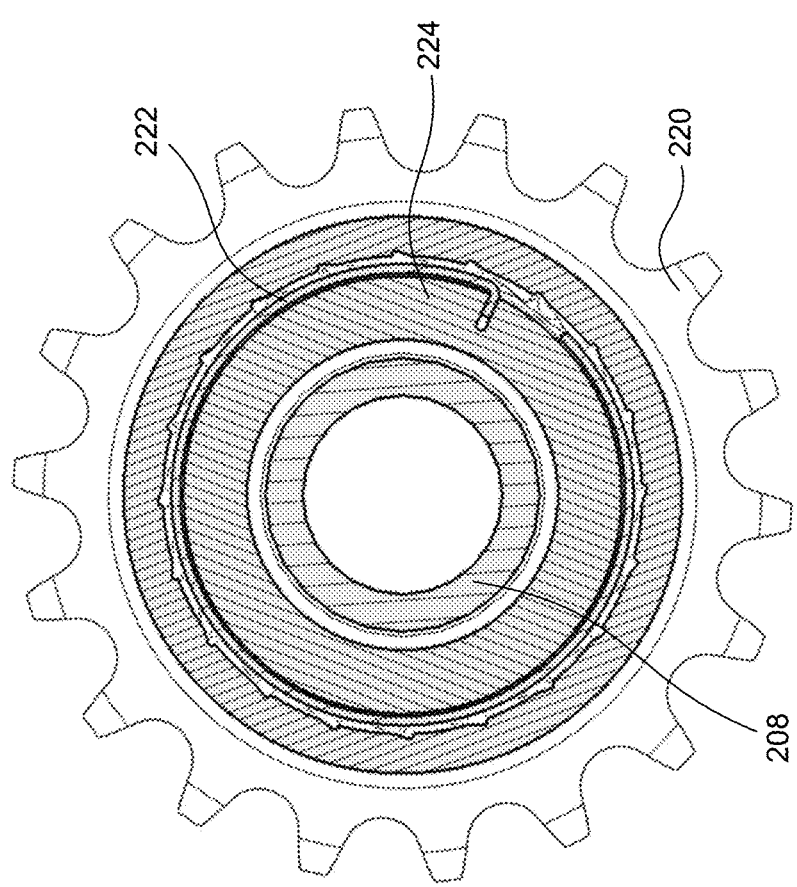
FIG. 21 is a section view along 21-21 of the multi-speed freewheel in FIG. 18 according to various aspects of the invention.

As shown in FIG. 21, rotating pedal shaft 116 and the transmission components in the drive direction can cause the rotation in the drive direction of shift ring 224 because at least one of pawl 236 and pawl 237 can drivingly engage with teeth 250 and end 229 of extended surface 226. The rotation in the drive direction of shift ring 224 can decrease the diameter, D3, of friction element 222, reducing the friction forces and decoupling shift ring 224 from first sprocket 220.

Figure 22:
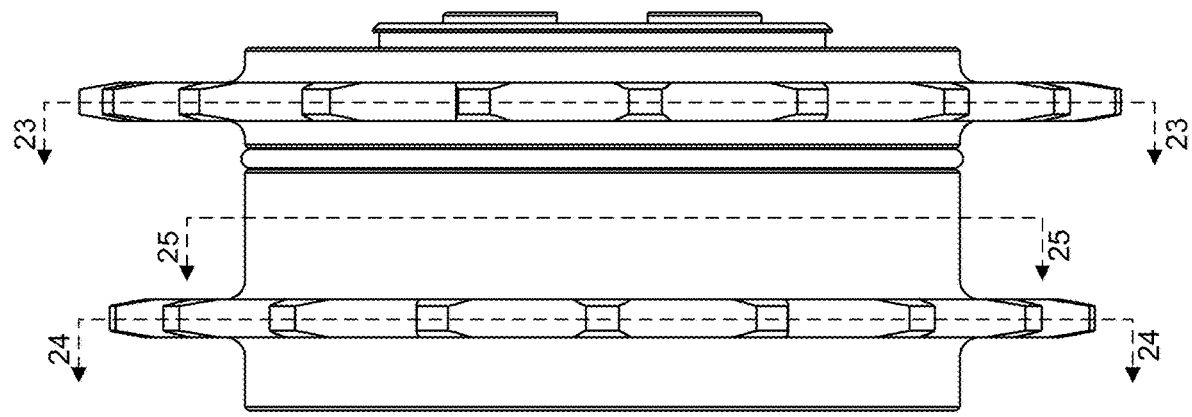
FIG. 22 is a rear view of the multi-speed freewheel of FIG. 3 arranged on a longitudinal axis transitioning from drivingly engaging at a second gear ratio to a first gear ratio according to various aspects of the invention.
Figure 23:
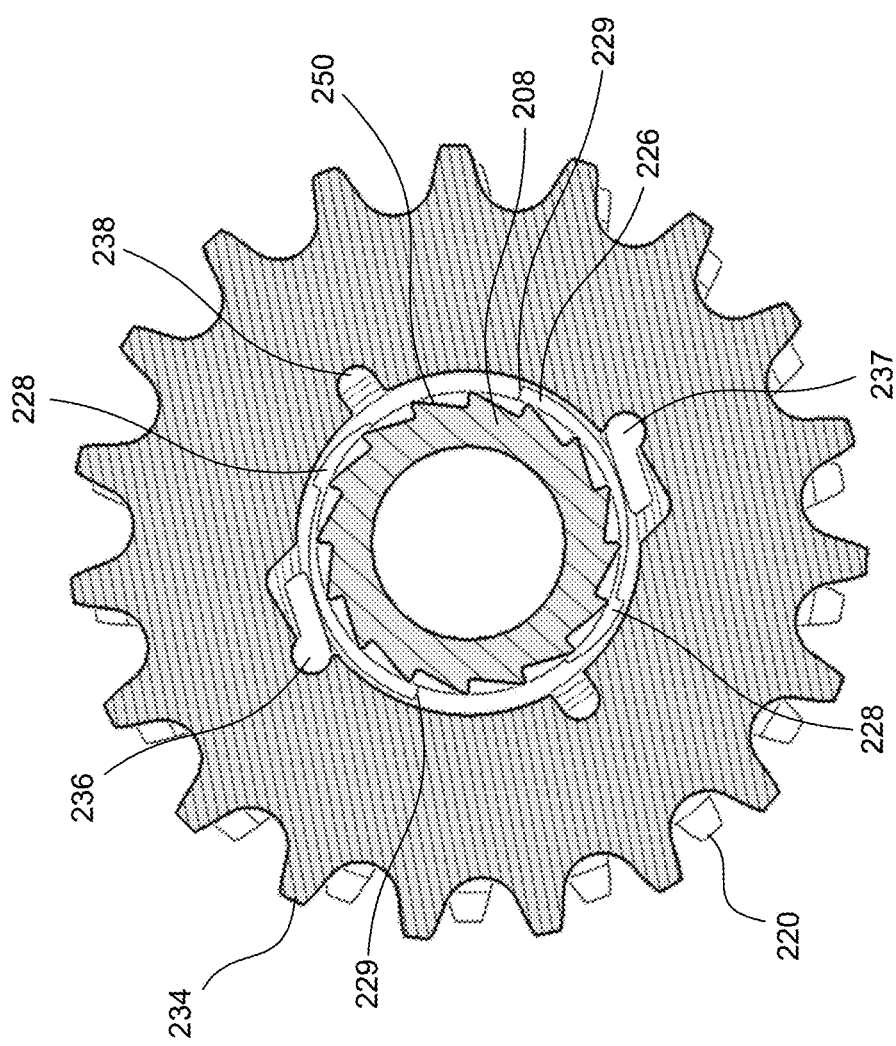
FIG. 23 is a section view along 23-23 of the multi-speed freewheel in FIG. 22 according to various aspects of the invention.
Figure 24:
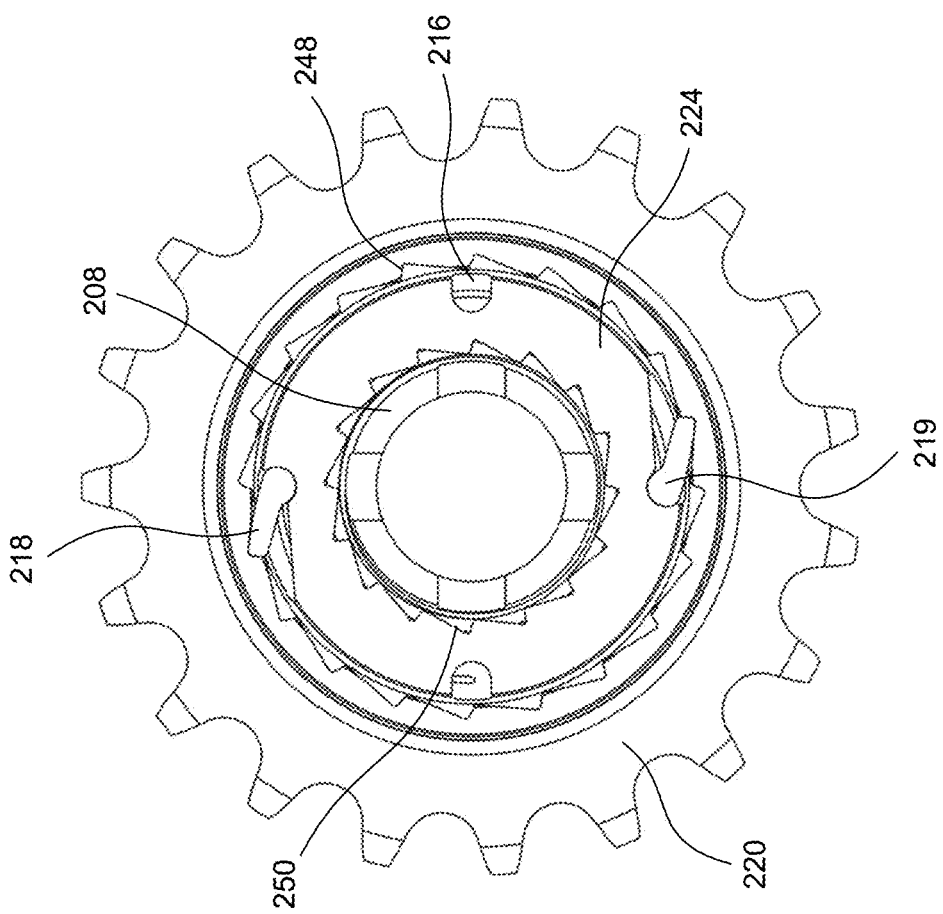
FIG. 24 is a section view along 24-24 of the multi-speed freewheel in FIG. 22 according to various aspects of the invention.

With reference to FIGS. 22-25, multi-speed freewheel 206 can transition from the second gear ratio to the first gear ratio. With reference to FIGS. 22-23, in some aspects, as pedal shaft 116 are rotated in the non-drive direction, at least one of pawl 236 and pawl 237 of second sprocket 234 can continually engage notches 228 of shift ring 224, end 229 of extended surface 226, and teeth 250 of driver 208. Accordingly, the transmission can continually be toggled between the first gear ratio and the second gear ratio. As shown in FIG. 24, at least one of pawl 218 and pawl 219 located on driver 208 can remain engaged with teeth 248 of first sprocket 220.

Figure 25:
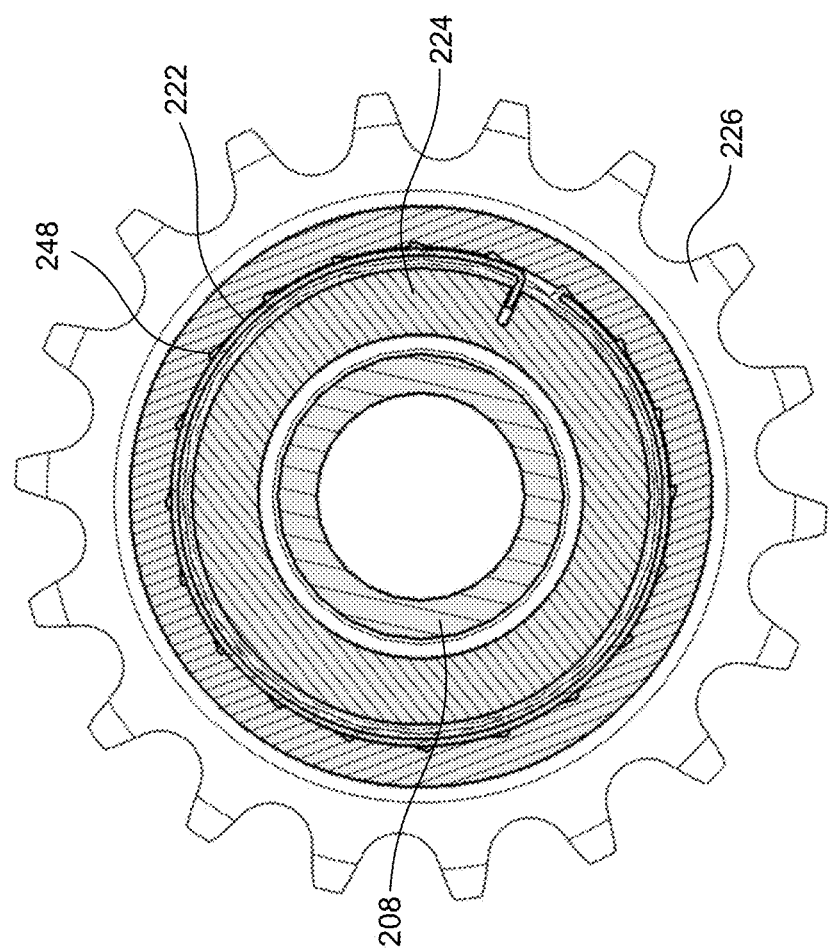
FIG. 25 is a section view along 25-25 of the multi-speed freewheel in FIG. 22 according to various aspects of the invention.

As shown in FIG. 25, rotating pedal shaft 116 and the transmission components in the non-drive direction can cause the rotation in the non-drive direction of shift ring 224 because shift ring 224 can be coupled to first sprocket 220. The rotation in the non-drive direction of shift ring 224 can increase the diameter, D3, of friction element 222, increasing the friction forces and coupling shift ring 224 and friction element 222 to first sprocket 220.

Pawl 236 and pawl 237 rotates in the non-drive direction at the second gear ratio faster than shift ring 224 coupled to first sprocket 220, which rotates at the first gear ratio. This can cause pawl 236 and pawl 237 to rotate relative to shift ring 224. As a result, pawl 236 and/or pawl 237 can advance away from notches 228 and extended surface 226 of shift ring 224. In an aspect, the non-drive direction rotation does not reach a predetermined rotation such that at least one of pawl 236 and pawl 237 can be biased toward teeth 250 of driver 208 and can engage with teeth 250 and end 229 of extended surface 226 of shift ring 224. As a result, when pedal shaft 116 and the transmission components are rotated in the drive direction, pawl 236 and pawl 237 cannot be drivingly engaged with teeth 250 and end 229 and second sprocket 234 cannot drivingly engage with driver 208 to move rear wheel 104 and propel bicycle 100 in the drive direction. In this aspect, pawl 218 and/or pawl 219 can be drivingly engaged with teeth 248 such that driver 208 is drivingly engaged to first sprocket 220 and rear wheel 104 can be moved and bicycle 100 can be propelled in the drive direction at the first gear ratio. At least one of pawl 236 and pawl 237 can be engaged with notches 228 of shift ring 224 such that at least one of pawl 236 and pawl 237 can be drivingly engaged with shift ring 224. In this aspect, shift ring 224 can rotate in the drive direction at the second gear ratio provided by second sprocket 234. In this configuration, the pawl 236 and pawl 237 can be inactive (i.e., prevented from drivingly engaging with teeth 250 of driver 208 and end 229 of extended surface 226).

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventor(s), and thus, are not intended to limit the present invention(s) and the appended claims in any way.

The present invention(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. The foregoing description of the specific embodiments will so fully reveal the general nature of the invention(s) that others can, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance. The breadth and scope of the present invention(s) should not be limited by any of the above-described exemplary embodiments, but should be defined only in accordance with the following claims and their equivalents.

What is claimed is:

1. A multi-speed transmission for a bicycle wheel hub, comprising:
   a driver to be arranged on a longitudinal axis of the bicycle wheel hub, the driver including a groove and a plurality of drive teeth; and
   a multi-speed freewheel arranged on the longitudinal axis of the bicycle wheel hub, the multi-speed freewheel comprising:
      a first sprocket to be connected to a first pedal drive sprocket of a bicycle;
      a second sprocket to be connected to a second pedal drive sprocket of the bicycle,
      a plurality of pawls arranged radially on the second sprocket to engage with the drive teeth when a pedal shaft is rotated in a non-drive direction a non-drive direction for a predetermined rotation, a plurality of bias elements arranged radially within an interior area of the second sprocket to bias the plurality of pawls toward the drive teeth, and a shift ring arranged within the interior area of the second sprocket to selectively block engagement of the plurality of pawls with the drive teeth.

2. The multi-speed transmission of claim 1, wherein the first sprocket has a first gear ratio and the second sprocket has a second gear ratio, and wherein the second gear ratio is different than the first gear ratio.

3. The multi-speed transmission of claim 2, wherein the multi-speed freewheel is toggled between the first gear ratio and the second gear ratio by rotating the multi-speed freewheel in the non-drive direction.

4. The multi-speed transmission of claim 3, wherein the multi-speed freewheel is toggled between the second gear ratio and the first gear ratio by rotating the multi-speed freewheel in the non-drive direction.

5. The multi-speed transmission of claim 2, wherein the multi-speed freewheel is continually toggled between the first gear ratio and the second gear ratio by continually rotating the multi-speed freewheel in the non-drive direction.

6. The multi-speed transmission of claim 2, wherein the second gear ratio is higher than the first gear ratio.

7. The multi-speed transmission of claim 2, wherein the second gear ratio is lower than the first gear ratio.

8. The multi-speed transmission of claim 1, wherein the shift ring further comprises a friction element.

9. The multi-speed transmission of claim 8, wherein the friction element further has a diameter.

10. The multi-speed transmission of claim 9, wherein the diameter of the friction element increases when the shift ring is rotated in the non-drive direction.

11. The multi-speed transmission of claim 9, wherein the diameter of the friction element decreases when the shift ring is rotated in a drive direction.

12. A multi-speed transmission for a bicycle, comprising:
a driver having a groove and a plurality of drive teeth;
a first sprocket pawl arranged in the groove;
a first sprocket engaged with the first sprocket pawl, the first sprocket having a first gear ratio;
a second sprocket having a second gear ratio higher than the first gear ratio;
a second sprocket pawl arranged within the second sprocket to selectively drivingly engage one or more of the plurality of drive teeth; and
a shift ring to rotate with the first sprocket and extend within an interior area of the second sprocket, the shift ring including a notch to selectively engage the second sprocket pawl and prevent the second sprocket pawl from drivingly engaging the one or more of the plurality of drive teeth.

13. A multi-speed transmission for a bicycle, comprising:
a first sprocket pawl arranged in a groove of a driver;
a first sprocket engaged with the first sprocket pawl, the first sprocket having a first gear ratio;
a second sprocket having a second gear ratio higher than the first gear ratio;
a second sprocket pawl arranged within the second sprocket to selectively drivingly engage one or more of a plurality of drive teeth of the driver; and
a shift ring to rotate with the first sprocket and extend within an interior area of the second sprocket, the shift ring including a notch to selectively engage the second sprocket pawl and prevent the second sprocket pawl from drivingly engaging the one or more of the plurality of drive teeth.

14. The multi-speed transmission of claim 13, wherein the multi-speed transmission is continually toggled between the first gear ratio and the second gear ratio by continually rotating the multi-speed transmission in a non-drive direction.

15. The multi-speed transmission of claim 13, wherein the multi-speed transmission is toggled between the first gear ratio and the second gear ratio by rotating the multi-speed transmission in a non-drive direction.

16. The multi-speed transmission of claim 13, wherein the multi-speed transmission is toggled between the second gear ratio and the first gear ratio by rotating the multi-speed transmission in a non-drive direction.

17. The multi-speed transmission of claim 13, wherein the shift ring further comprises a friction element.

18. The multi-speed transmission of claim 17, wherein the friction element has a diameter.

19. The multi-speed transmission of claim 18, wherein the diameter of the friction element changes when the shift ring is rotated in a non-drive direction.

* * * * *